US007808369B2

(12) United States Patent
Brinton et al.

(10) Patent No.: US 7,808,369 B2
(45) Date of Patent: *Oct. 5, 2010

(54) SYSTEM AND PROCESS TO ENSURE PERFORMANCE OF MANDATED INSPECTIONS

(75) Inventors: Brett Brinton, Bellevue, WA (US); William Brinton, Jr., Des Moines, WA (US); Daniel Mayer, Issaquah, WA (US); Eric S. Manegold, Seattle, WA (US); Charles Michael McQuade, Issaquah, WA (US)

(73) Assignee: Zonar Systems, Inc., Seattle, WA (US)

( * ) Notice: Subject to any disclaimer, the term of this patent is extended or adjusted under 35 U.S.C. 154(b) by 125 days.

This patent is subject to a terminal disclaimer.

(21) Appl. No.: 12/203,619

(22) Filed: Sep. 3, 2008

(65) Prior Publication Data

US 2008/0316007 A1 Dec. 25, 2008

Related U.S. Application Data

(63) Continuation of application No. 11/425,222, filed on Jun. 20, 2006, now Pat. No. 7,564,375, which is a continuation-in-part of application No. 11/247,953, filed on Oct. 11, 2005, now Pat. No. 7,362,229, which is a continuation-in-part of application No. 10/915,957, filed on Aug. 11, 2004, now Pat. No. 7,557,696, which is a continuation-in-part of application No. 10/219,892, filed on Aug. 15, 2002, now Pat. No. 6,804,626, said application No. 11/425,222 is a continuation-in-part of application No. 10/862,122, filed on Jun. 3, 2004, now Pat. No. 7,117,121, which is a continuation-in-part of application No. 10/219,892, which is a continuation-in-part of application No. 09/951,104, filed on Sep. 11, 2001, now Pat. No. 6,671,646.

(51) Int. Cl.
*G08B 25/00* (2006.01)
*G08B 21/22* (2006.01)
*G21C 17/00* (2006.01)

(52) U.S. Cl. .................. 340/306; 340/433; 340/439; 340/539.13; 340/539.23; 340/988; 340/309.16; 340/573.1; 702/182; 702/187

(58) Field of Classification Search .............. 340/306, 340/433, 439, 573.1, 574, 539.11, 539.13, 340/457, 988; 702/182, 187; 235/376, 384
See application file for complete search history.

(56) References Cited

U.S. PATENT DOCUMENTS 3,573,620 A * 4/1971 Ashley et al. .............. 340/525

(Continued)

FOREIGN PATENT DOCUMENTS

CA 2138378 4/1994

(Continued)

OTHER PUBLICATIONS

Tiscor: *Inspection Manager 6.0 User Guide*. USA; 2004. 1-73.
Tuttle, John R. "Digital RF/ID Enhances GPS" Proceedings of the Second Annual Wireless Symposium, pp. 406-411, Feb. 15-18, 1994, Santa Clara, CA.

(Continued)

*Primary Examiner*—Davetta W Goins
*Assistant Examiner*—Anne V Lai
(74) *Attorney, Agent, or Firm*—Ronald M. Anderson

(57) ABSTRACT

A method and apparatus to provide evidence that a person who is intended to make a required inspection was actually physically present at a predefined location associated with the inspection, so that the inspection could have been done, and if not, to provide an indication of the failure to perform the inspection. This invention is particularly well suited to determine if required pre/post-trip inspections of vehicles have been performed. Detecting a triggering condition, such as powering on (or off) equipment, indicates the beginning of a period of time during which the inspection is to be performed. The monitoring system waits for a predetermined event to occur, which indicates the period of time has expired and determines if data corresponding to the inspection have been received. If not, it is concluded that the inspection has not been performed.

23 Claims, 15 Drawing Sheets

U.S. PATENT DOCUMENTS

| | | | |
|---|---|---|---|
| 3,990,067 A * | 11/1976 | Van Dusen et al. | 340/306 |
| 4,025,791 A | 5/1977 | Lennington et al. | 250/341 |
| 4,258,421 A | 3/1981 | Juhasz et al. | 364/424 |
| 4,325,057 A | 4/1982 | Bishop | 340/539 |
| 4,602,127 A | 7/1986 | Neely et al. | 379/68 |
| 4,763,356 A | 8/1988 | Day, Jr. et al. | 379/368 |
| 4,799,162 A | 1/1989 | Shinkawa et al. | 364/436 |
| 4,804,937 A | 2/1989 | Barbiaux et al. | 340/52 F |
| 4,897,792 A | 1/1990 | Hosoi | 364/449 |
| 5,058,044 A | 10/1991 | Stewart et al. | 364/551.01 |
| 5,068,656 A | 11/1991 | Sutherland | 340/989 |
| 5,120,942 A * | 6/1992 | Holland et al. | 235/376 |
| 5,128,651 A * | 7/1992 | Heckart | 340/433 |
| 5,206,643 A | 4/1993 | Eckelt | 340/932.2 |
| 5,223,844 A | 6/1993 | Mansell et al. | 342/357.07 |
| 5,243,323 A * | 9/1993 | Rogers | 340/433 |
| 5,321,629 A | 6/1994 | Shirata et al. | 702/187 |
| 5,394,136 A | 2/1995 | Lammers et al. | 340/439 |
| 5,399,844 A | 3/1995 | Holland | 235/376 |
| 5,459,304 A | 10/1995 | Eisenmann | 235/380 |
| 5,459,660 A | 10/1995 | Berra | 701/33 |
| 5,499,182 A | 3/1996 | Ousborne | 364/424.04 |
| 5,541,845 A | 7/1996 | Klein | 364/449 |
| 5,546,305 A | 8/1996 | Kondo | 364/424.03 |
| 5,557,254 A | 9/1996 | Johnson et al. | 340/426 |
| 5,557,268 A | 9/1996 | Hughes et al. | 340/933 |
| 5,572,192 A * | 11/1996 | Berube | 340/574 |
| 5,585,552 A | 12/1996 | Heuston et al. | 73/116 |
| 5,600,323 A | 2/1997 | Boschini | 341/173 |
| 5,610,596 A * | 3/1997 | Petitclerc | 340/825.23 |
| 5,623,258 A * | 4/1997 | Dorfman | 340/10.41 |
| 5,629,678 A | 5/1997 | Gargano et al. | 340/573.4 |
| 5,671,158 A | 9/1997 | Fournier et al. | 345/8 |
| 5,680,328 A | 10/1997 | Skorupski et al. | 364/550 |
| 5,719,771 A | 2/1998 | Buck et al. | 364/443 |
| 5,731,893 A | 3/1998 | Dominique | 359/379 |
| 5,758,299 A | 5/1998 | Sandborg et al. | 701/29 |
| 5,808,565 A | 9/1998 | Matta et al. | 340/994 |
| 5,839,112 A | 11/1998 | Schreitmueller et al. | 705/4 |
| 5,874,891 A | 2/1999 | Lowe | 340/433 |
| 5,942,753 A | 8/1999 | Dell | 250/338.1 |
| 5,995,898 A | 11/1999 | Tuttle | 701/102 |
| 6,043,661 A | 3/2000 | Gutierrez | 324/504 |
| 6,054,950 A | 4/2000 | Fontana | 342/463 |
| 6,078,255 A | 6/2000 | Dividock et al. | 340/539 |
| 6,092,021 A | 7/2000 | Ehlbeck et al. | 701/123 |
| 6,107,915 A | 8/2000 | Reavell et al. | 340/433 |
| 6,107,917 A | 8/2000 | Carrender et al. | 340/505 |
| 6,128,570 A | 10/2000 | McGovern et al. | 73/660 |
| 6,169,943 B1 | 1/2001 | Simon et al. | 701/29 |
| 6,236,911 B1 | 5/2001 | Kruger | 701/1 |
| 6,253,129 B1 | 6/2001 | Jenkins et al. | 701/29 |
| 6,256,579 B1 | 7/2001 | Tanimoto | 701/201 |
| 6,259,358 B1 * | 7/2001 | Fjordbotten | 340/433 |
| 6,263,273 B1 | 7/2001 | Henneken et al. | 701/207 |
| 6,370,454 B1 | 4/2002 | Moore | 701/29 |
| 6,374,176 B1 | 4/2002 | Schmier et al. | 701/200 |
| 6,396,413 B2 | 5/2002 | Hines et al. | 340/825.49 |
| 6,411,891 B1 | 6/2002 | Jones | 701/201 |
| 6,438,472 B1 | 8/2002 | Tano et al. | 701/35 |
| 6,450,411 B1 | 9/2002 | Rash et al. | 236/44 A |
| 6,456,039 B1 | 9/2002 | Lauper et al. | 320/107 |
| 6,502,030 B2 | 12/2002 | Hilleary | 701/207 |
| 6,505,106 B1 | 1/2003 | Lawrence | 701/35 |
| 6,529,808 B1 | 3/2003 | Diem | 701/29 |
| 6,539,296 B2 | 3/2003 | Diaz et al. | 701/33 |
| 6,594,621 B1 | 7/2003 | Meeker | 702/185 |
| 6,597,973 B1 | 7/2003 | Barich et al. | 701/29 |
| 6,609,082 B2 | 8/2003 | Wagner | 702/182 |
| 6,614,392 B2 | 9/2003 | Howard | 342/357.07 |
| 6,664,897 B2 | 12/2003 | Pape et al. | 340/573.3 |
| 6,671,646 B2 | 12/2003 | Manegold et al. | 702/127 |
| 6,708,113 B1 | 3/2004 | Von Gerlach et al. | 701/210 |
| 6,727,818 B1 * | 4/2004 | Wildman et al. | 340/573.1 |
| 6,804,626 B2 | 10/2004 | Manegold et al. | 702/182 |
| 6,834,259 B1 | 12/2004 | Markwitz et al. | 702/187 |
| 6,894,617 B2 | 5/2005 | Richman | 340/573.1 |
| 6,909,947 B2 | 6/2005 | Douros et al. | 701/29 |
| 7,027,955 B2 | 4/2006 | Markwitz et al. | 702/187 |
| 7,048,185 B2 | 5/2006 | Hart et al. | 235/384 |
| 7,103,460 B1 | 9/2006 | Breed | 701/29 |
| 7,117,121 B2 * | 10/2006 | Brinton et al. | 702/182 |
| 7,174,243 B1 | 2/2007 | Lightner et al. | 701/33 |
| 7,174,277 B2 | 2/2007 | Vock et al. | 702/188 |
| 7,254,516 B2 | 8/2007 | Case, Jr. et al. | 702/182 |
| 2001/0047283 A1 | 11/2001 | Melick et al. | 705/8 |
| 2001/0053983 A1 | 12/2001 | Reichwein et al. | 705/1 |
| 2002/0016655 A1 | 2/2002 | Joao | 701/35 |
| 2002/0022979 A1 | 2/2002 | Whipp et al. | 705/5 |
| 2002/0022984 A1 | 2/2002 | Daniel et al. | 705/8 |
| 2002/0065698 A1 | 5/2002 | Schick et al. | 705/8 |
| 2002/0107833 A1 | 8/2002 | Kerkinni | 707/1 |
| 2002/0107873 A1 | 8/2002 | Winkler et al. | 707/104.1 |
| 2002/0111725 A1 | 8/2002 | Burge | 701/29 |
| 2002/0122583 A1 | 9/2002 | Thompson | 382/141 |
| 2002/0133273 A1 | 9/2002 | Lowrey et al. | 701/29 |
| 2002/0133275 A1 | 9/2002 | Thibault | 701/35 |
| 2002/0147610 A1 | 10/2002 | Tabe | 705/1 |
| 2002/0150050 A1 | 10/2002 | Nathanson | 370/241 |
| 2002/0156558 A1 | 10/2002 | Hanson et al. | 701/33 |
| 2002/0163449 A1 | 11/2002 | Flick | 340/988 |
| 2002/0178147 A1 | 11/2002 | Arroyo et al. | 707/2 |
| 2002/0188593 A1 | 12/2002 | Moser et al. | 707/1 |
| 2003/0030550 A1 | 2/2003 | Talbot | 340/433 |
| 2003/0033061 A1 | 2/2003 | Chen et al. | 701/33 |
| 2003/0109973 A1 | 6/2003 | Hensey et al. | 701/35 |
| 2003/0120745 A1 | 6/2003 | Katagishi et al. | 709/217 |
| 2004/0009819 A1 | 1/2004 | Koga | 464/51 |
| 2004/0236596 A1 | 11/2004 | Chowdhary et al. | 705/1 |
| 2005/0273250 A1 | 12/2005 | Hamilton et al. | 701/200 |
| 2006/0232406 A1 * | 10/2006 | Filibeck | 340/572.1 |
| 2007/0179709 A1 | 8/2007 | Doyle | 701/209 |
| 2008/0154489 A1 | 6/2008 | Kaneda et al. | 701/201 |
| 2008/0154712 A1 | 6/2008 | Wellman | 705/11 |

FOREIGN PATENT DOCUMENTS

| | | |
|---|---|---|
| CA | 2326892 | 10/1999 |
| CA | 2388572 | 5/2001 |
| EP | 2 116 968 | 11/2009 |
| WO | WO 03/023550 | 3/2003 |

OTHER PUBLICATIONS

Albright, Brian: "Indiana Embarks on Ambitious RFID roll out." *Frontline Solutions*. May 20, 2002; 2pp. Available at: <http://www.frontlinetoday.com/frontline/article/articleDetail.jsp?id=19358>.

Anonymous. "Transit agency builds GIS to plan bus routes." *American City & County*. vol. 118, No. 4. Published Apr. 1, 2003. 4pp. NDN-258-0053-0664-6.

Dwyer, H.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

Kurtz, Jennifer. "Indiana's E-Government: A Story Behind It's Ranking." *Incontext Indiana;s Workforce and Economy*. Jan.-Feb. 2003 vol. 4, No. 5pp. Available at <http://www.incontext.indiana.edu/2003/jan-feb03/governement.html>.

Quaan et al., "Guard Tour Systems." *Security Management ONLINE*. Sep. 16, 2003. 1pg. © 2000 <http://www.securitymanagement.com/ubb/Forum30/HTML/000066.html>.

Qualcomm. "Object FX Integrates TrackingAdvisor with QUALCOMM's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Spencer, Nancy. "Maximize Your Exposure." *Business Solutions*. Feb. 1999: 5pp. Available at:<http://www.businesssolutionsmag.com/Articles/1999_02/990208.htm>.

Tsakiri, M et al. Abstract: "Urban fleet monitoring with GPS and GLONASS." *Journal of Navigation*, vol. 51, No. 3. Published Sep. 1998. 2pp. NDN-174-0609-4097-3.

Tiscor: The Mobile Software Solutions Provider. *Inspection Manager: An Introduction*. nd. Slide presentation; 19pp. Available: www.TISCOR.com.

Want, Roy, "RFID A Key to Automating Everything." *Scientific American* (Jan. 2004): 58-65.

Contact: GCS (UK), Tewkesbury Gloucestershire. Dec. 11, 2002. 2pp. Copyright © 2000 GCS General Control System <http://www.gcs.at?eng/newsallegemein.htm>.

"*The Data Acquisition Unit Escorte*." The_Proxi_Escort.com. Nov. 20, 2001. 4pp. Copyright © 2000 GCS General Control Systems. <http://www.gcs.at/eng/produkte/hw/escorte.htm>.

"Detex Announces the Latest Innovation in Guard Tour Verification Technology." *DETEX Life Safety, Security and Security Assurance*. Jan. 1, 2003. 1pp. © 2002-2004 Detex Corporation. <http://www.detex.com/NewsAction.jspa?id=3>.

"D.O.T. Driver Vehicle Inspection Reports on your wireless phone!" *FleeTTrakkeR$_{LLC}$* 2002-2003 FleeTTrakkeR$_{LLC}$. All rights reserved <http://www.fleettrakker.com/web/index.jsp>.

"Nextel, Mortorola and Symbol Technologies Offer First Wireless Bar Code Scanner for Mobile Phones." *InvoiceDealers*. Jun. 11, 2003, http://theautochannel.com/news/2003/06/11/162927.html.

"New Products: OptoEscorte" *News*. Copyright © 2000 GCS General Control Systems Last modified: Nov. 12, 2002. 2pp. Available At: <http://www.gcs.at/eng/news/allgemein.html>.

"The PenMaster" and "The PSION Workabout." Copyright 2000 GCS General Control Systems. <http://www.gcs.at/eng/produkte/hw/penmaster.htm>.

"Tracking out of route: software helps fleets compare planned routes to actual miles. (TECHNOLOGY)." *Commercial Carrier Journal*. Published Oct. 1, 2005. 4pp. NDN-219-1054-1717-0.

"What is the Child Check-Mate Safety System"? *2002 © Child Checkmate Systems Inc.* <http://www.childcheckmate.com/what.html>.

* cited by examiner

SYSTEM AND PROCESS TO ENSURE PERFORMANCE OF MANDATED INSPECTIONS

RELATED APPLICATIONS

This application is a continuation of prior co-pending application Ser. No. 11/425,222, filed on Jun. 20, 2006, which itself is a continuation-in-part of prior application Ser. No. 11/247,953, filed on Oct. 11, 2005 and now issued as U.S. Pat. No. 7,362,229 on Apr. 22, 2008, which itself is a continuation-in-part of prior co-pending application Ser. No. 10/915,957, filed on Aug. 11, 2004, the benefit of the filing dates of which is hereby claimed under 35 U.S.C. §120. Prior co-pending application Ser. No. 11/425,222 is also a continuation-in-part of prior application Ser. No. 10/862,122, filed on Jun. 3, 2004 and now issued as U.S. Pat. No. 7,117,121 on Oct. 3, 2006, the benefit of the filing date of which is hereby claimed under 35 U.S.C. §120. Prior co-pending application Ser. No. 10/915,957 and prior application Ser. No. 10/862,122 are also both continuation-in-parts of prior application Ser. No. 10/219,892, filed on Aug. 15, 2002 and now issued as U.S. Pat. No. 6,804,626 on Oct. 12, 2004, which itself is a continuation-in-part of prior application Ser. No. 09/951,104, filed on Sep. 11, 2001 and now issued as U.S. Pat. No. 6,671,646 on Dec. 30, 2003, the benefit of the filing dates of which is hereby claimed under 35 U.S.C. §120.

BACKGROUND

Every day, millions of people rely on mass transportation to safely transport them to and from their destinations. For example, many children rely on school buses to transport them to and from school. However, all too often, a school bus driver makes the last stop for the day and returns the bus to the school bus yard only to discover that a child has failed to unload at the appropriate bus stop and is still on the bus. Although this situation is undesirable because of the unnecessary delay and the concern caused to parents, it can be remedied by a return trip to the child's bus stop (or home) to properly deliver the child. Far worse is the result when the school bus driver does not discover that a child has fallen asleep on the bus, and the school bus is parked in a yard overnight with the child still onboard. As a result, a child can be left alone on the bus in the yard for hours, with the parents experiencing much greater concern, believing that their child might have been abducted after getting off the bus. Clearly, it would be desirable to ensure that every school bus driver does a post-trip inspection of the school bus immediately after completing the driver's route, e.g., after the bus is returned to the yard where it is kept during the day or overnight, to determine if any child remains on the bus.

There is another reason why vehicle inspections are important. Many adults rely on mass transit systems, such as trains and buses, to transport them to and from work. Tragically, a terrorist attack that consisted of a series of ten explosions occurring onboard four commuter trains left approximately 200 people dead and more than 1,800 people wounded in Madrid, Spain, when bombs packed in sports bags left on the trains detonated. It would be desirable to check for packages left on vehicles after each trip is completed, to ensure that any suspicious package is identified and appropriate measures taken. Such an inspection would also be useful in detecting packages inadvertently left on the vehicle, thereby facilitating their return to the rightful owner.

U.S. Pat. No. 5,874,891 (Lowe) discloses one prior art device that seeks to remind the driver to check for remaining passengers or articles left behind on a bus and to perform an inspection of the rear door on a bus to ensure that it is working properly. The system uses the existing wiring of the school bus and is coupled to the ignition, lighting, and rear door switches of the bus. When the driver turns on the ignition of the bus at the start of a run, the system enters a stand-by state until a light activating switch has been turned on and off. At this point, the system is in an armed state while the driver completes the run. When the run is complete and the driver turns off the ignition switch, the system enters an alarm state, and a buzzer sounds immediately. The buzzer is silenced only when the driver walks to the back of the bus and opens and closes the rear door. It is expected that while moving to the rear of the bus, the driver will inspect for people still on the bus, or articles that have been left behind. However, this system only alerts those who are within hearing distance of the alarm sounding inside the bus and does so immediately upon the vehicle being powered off at any time, even before a run is completed. Furthermore, if the vehicle is parked alongside other buses, it is not apparent which bus has an alarm activated, since there is no unique identification of the bus in which the alarm is active. And the alarm can only be silenced by manually engaging or disengaging a switch to open and close the rear door, which may not require the driver to walk all the way to the rear of the bus, since the rear door is a few rows in front of the last row of seating in the bus. The disclosed system is only usable on a bus with a rear door, which most school buses do not include. Thus, it is apparent that the prior art does not teach or suggest a complete solution to the problems discussed above.

It would therefore be desirable to provide a method and apparatus for performing an inspection usable for any type of vehicle that provides an alarm not only to the driver but also to those outside the vehicle, and only at a location where the inspection should occur. This alarm should be provided if it is determined that the inspection has not been performed before a predefined event has occurred. In addition, the method and apparatus should provide a unique identification to monitoring personnel of any vehicle where the required inspection apparently has not been completed.

SUMMARY

This application specifically incorporates by reference the disclosures and drawings of each patent application and issued patent identified above as a related application.

The present invention verifies whether an inspection has likely been performed during a specified period. The present invention is particularly well suited to determining whether a post-trip inspection of a vehicle has been performed. The vehicle can be any form of conveyance that carries one or more passengers or cargo, including over the road vehicles, air vehicles, marine vehicles, fresh water vehicles, submersibles, and space vehicles. It is important that a post-trip inspection be carried out for the reasons noted above. This invention thus can provide evidence that a person making the inspection was at least actually physically present at a checkpoint or location that is reached by moving through the vehicle, so that the person should have completed the inspection. The inspection may be done because of safety, maintenance, or security concerns, or for other reasons, such as checking for a person who might still remain on the vehicle.

Accordingly, one aspect of the present invention is directed to a method for verifying that a post-trip inspection of a vehicle has been performed. The first step is to detect that the vehicle has completed a trip. Next, a signal is produced indicating that a person has moved through the vehicle to a predefined location within the vehicle. While this approach cannot guarantee that the person actually did the inspection, it can provide evidence that the person moved through the vehicle along a path that would be followed if conducting the post-trip inspection. Since time may be important, the method determines if the signal has been received before a predefined event occurs. The predefined event can be a lapse of a predefined interval of time since detecting that the vehicle completed the trip, a lapse of a predetermined time after powering off the vehicle, or activation of a switch that is external to the vehicle, where activation of the switch is intended to indicate that at least the post-trip inspection has been completed. If the signal has not been received before a predefined event occurs, then the method determines that the person cannot yet have completed the post-trip inspection of the vehicle, which produces an alarm condition. The alarm condition is preferably either an audible alarm that is audible outside the vehicle, or a visible alarm that is visible outside the vehicle.

When detecting that the vehicle has completed a trip, the method may include the step of uniquely identifying the vehicle and sensing the vehicle arriving at a location that corresponds to an end of the trip. For example, to uniquely identify the vehicle, a token on the vehicle can be remotely read. Since the token is uniquely associated with the vehicle, the arrival of that specific vehicle at the end of its trip is thus detected.

Furthermore, the step of transmitting the signal can occur several different ways. In one embodiment, a token that is disposed in the predefined location is read. The person moving through the vehicle can carry a portable device used to read the unique identification code that is disposed at the predefined location. The portable device also preferably displays at least one prompt to the person regarding the post-trip inspection. For example, the display may prompt the person to check for a child remaining on a school bus, or to check for a package that may have been left on the vehicle.

In a second embodiment, the steps include actuation of a switch that is disposed in the predefined location. The switch is actuated by the person upon reaching the predefined location. Alternatively, a unique identification code that is disposed proximate the predefined location is read with a sensor.

Another aspect of the present invention is directed to a system for verifying whether a post-trip inspection of a vehicle has been performed. The system includes a detector, sensor, and monitor disposed in a location separate from the vehicle. The detector detects when the vehicle has completed a trip by producing a first signal indicative thereof. A suitable detector may be a pressure sensor disposed at a location corresponding to an end of the trip and which responds to a weight of the vehicle by producing the first signal, or a light sensor that detects passage of the vehicle as the vehicle interrupts light received from a source, or a video camera disposed at a location corresponding to an end of the trip and which produces an image of at least a portion of the vehicle that is indicative of the vehicle. Another type of detector that may be used responds to a signal from a radio frequency (RF) source. In this case, either the RF source or the RF detector can be disposed on the vehicle, and the other of the RF source and the RF detector disposed at the location corresponding to the end of the trip. The detector can also be a token reading device that responds to a token disposed on the vehicle, which is read by the token reading device when the vehicle completes the trip, or a responder that responds by producing the first signal when the responder is proximate a token. Again, either the token or the responder can be disposed on the vehicle, and the other of the two devices disposed so as to detect the vehicle as it completes a trip.

A sensor produces a second signal indicating that a person has reached a predefined location within the vehicle, where the predefined location is accessible only by moving through an interior of the vehicle while nominally completing a post-trip inspection. The sensor includes a responder that responds by producing the second signal when the responder is proximate a token. Either the token or the responder is disposed at the predefined location within the vehicle and the other of the token and the responder is portable and carried by a person moving to the predefined location within the vehicle. The responder includes a display on which at least one prompt regarding the post-trip inspection is displayed to a person.

A monitor that receives the first signal from the detector and the second signal from the sensor is also included in the system. The monitor produces an indication that the person cannot yet have performed the post-trip inspection of the vehicle if, after the first signal was received by the monitor, the second signal has not been received by the monitor before a predefined event occurs. The indication is an alarm condition and includes at least one of a status message displayed on the monitor, an audible sound, and a visible light. The predefined event comprises at least one of a lapse of a predefined interval of time since detecting that the vehicle completed the trip, a lapse of a predetermined time after powering off the vehicle, and activation of a switch that is external to the vehicle, wherein activation of the switch is intended to indicate that at least the post-trip inspection has been completed.

The first signal is conveyed to the monitor over at least one of a wireless communication link or a wired communication link. The second signal is conveyed to the monitor over at least one of a wireless communication link; and a wired communication link. One of the first signal and the second signal uniquely identifies the vehicle.

In one preferred embodiment of the system, also included are a transmitter for transmitting the second signal produced by the sensor and a receiver that receives the second signal. The receiver produces an output in response to the second signal, and the output signal is conveyed to the monitor.

In another preferred embodiment, the sensor also includes a switch that is actuated by a person arriving at the predefined location, causing the first signal to be produced. A transmitter activated by the switch transmits the first signal.

The system can include an optically encoded identifier, and the sensor then comprises an optical reader for reading the optically encoded identifier. Either the optical reader or the optically encoded identifier is disposed at the predefined location within the vehicle, and the other of the optical reader and optically encoded identifier is carried by a person to the predefined location within the vehicle.

In accord with the present invention, the inspection is not limited to the interior of the vehicle, and includes external locations as well. In a generally similar embodiment of the invention, the invention determines whether a person was in a position to make a pre-trip inspection of a vehicle, with respect to both internal and external portions of the vehicle, and embodies similar steps and components. A first signal is generated after a triggering condition indicates the vehicle has completed a trip, or is ready to start a trip. A second signal is generated once the inspection has been completed. After a predetermined event has occurred, such as the expiration of a predefined time period, a monitor that has received the first signal determines if the second signal has also been received, and if not, an indication is provided that the inspection has not yet been completed.

Yet another embodiment of the present invention determines whether a person was in a position to perform at least one of a pre-trip inspection and a post-trip inspection. This embodiment differs from those described above in that the first signal is not transmitted to a monitor; instead, the first signal (generated after a triggering condition indicates the vehicle has completed a trip, or is ready to start a trip, as described above) is sent to a sensor. The sensor is configured to determine if a person has been proximate at least one predefined location associated with the vehicle. The sensor is configured to transmit a wireless communication to a remote receiver indicating the inspection has not been not completed, if: (1) the sensor has received the first signal; (2) a predetermined event has occurred; and (3) the sensor has not detected that a person has been proximate the at least one predefined location. In this embodiment, a signal is sent when it is determined that the required inspection has not been performed, and in the earlier described embodiments, it is the lack of a second signal that indicates the required inspection has not been performed.

This invention can also determine whether a person was in a position to carry out other types of inspections that are not limited to inspections of a vehicle.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 14A:
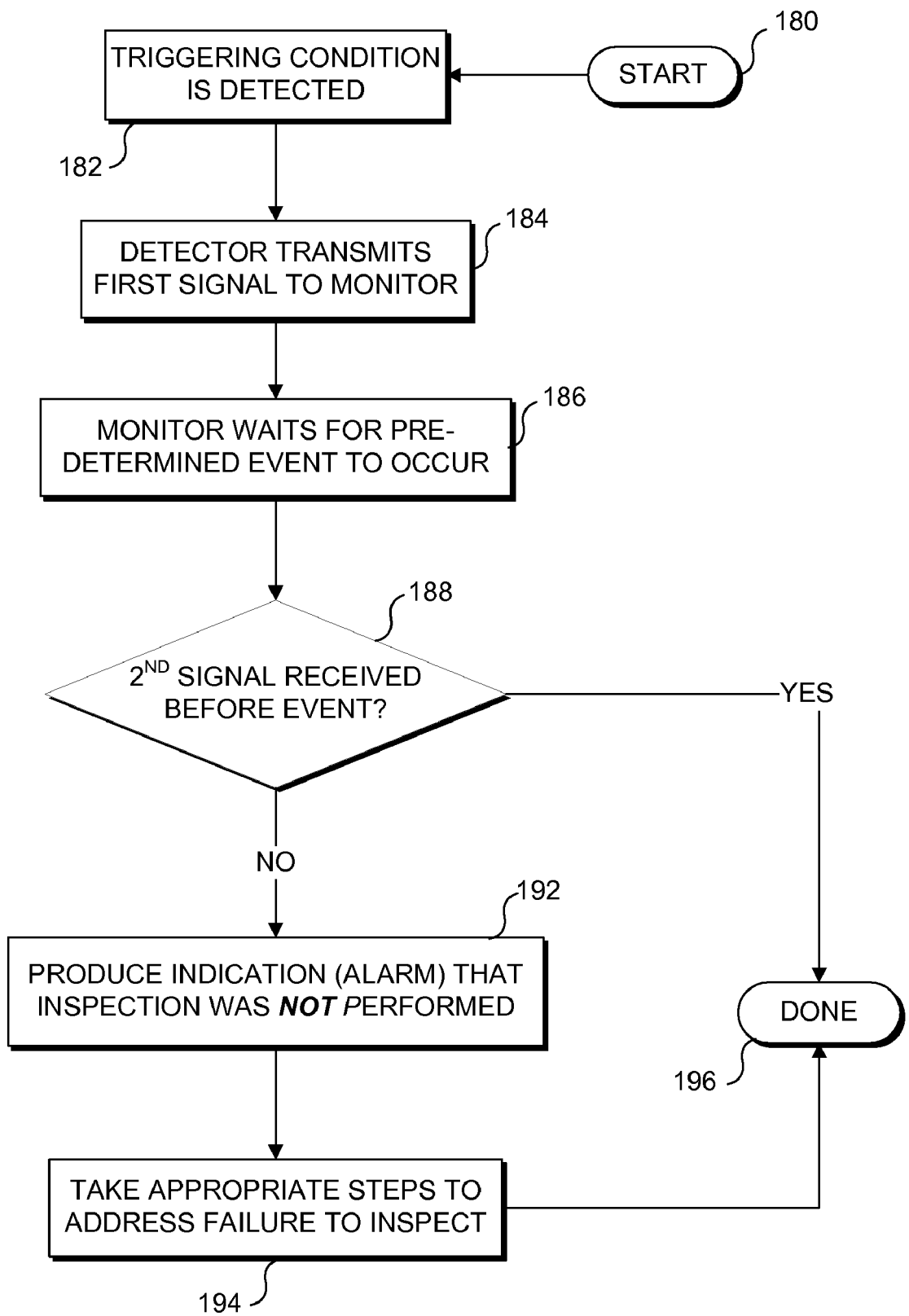
Figure 14B:
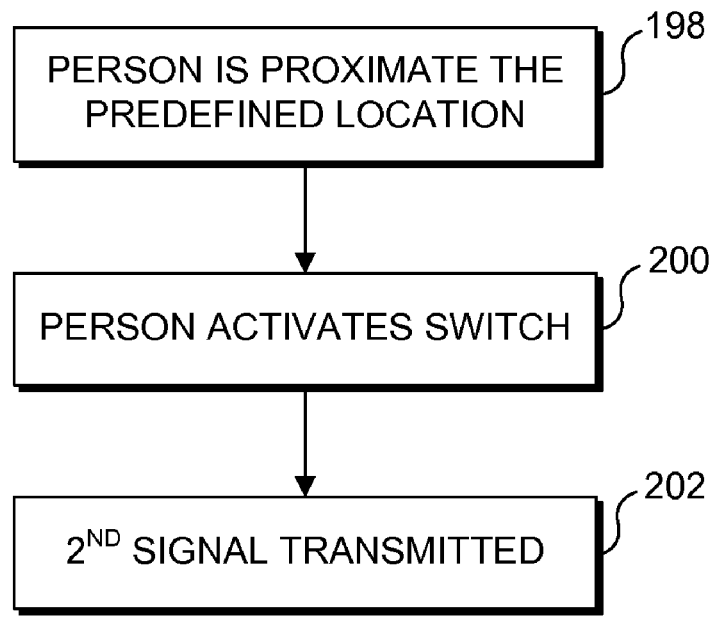
Figure 14C:
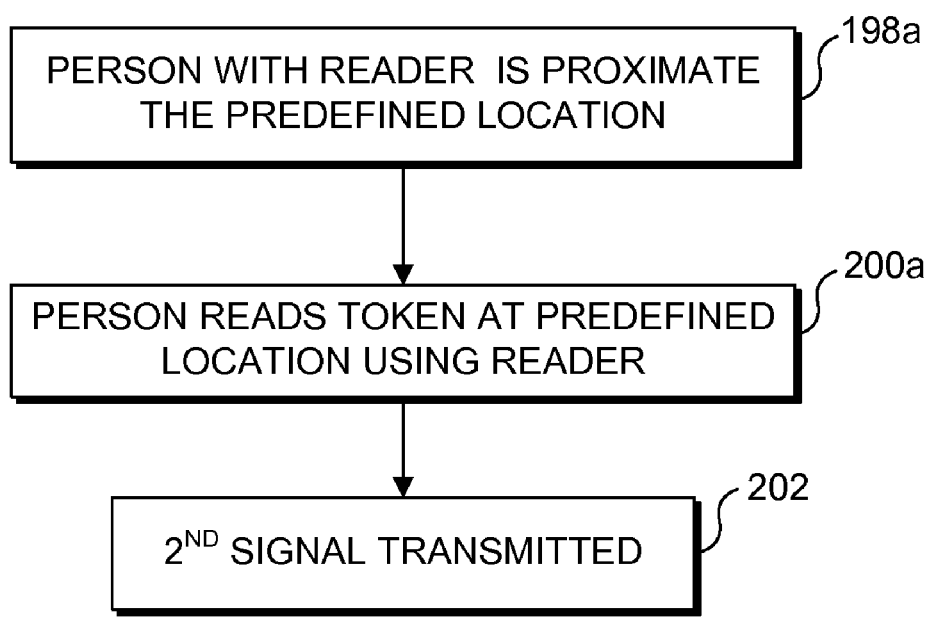
Figure 15:
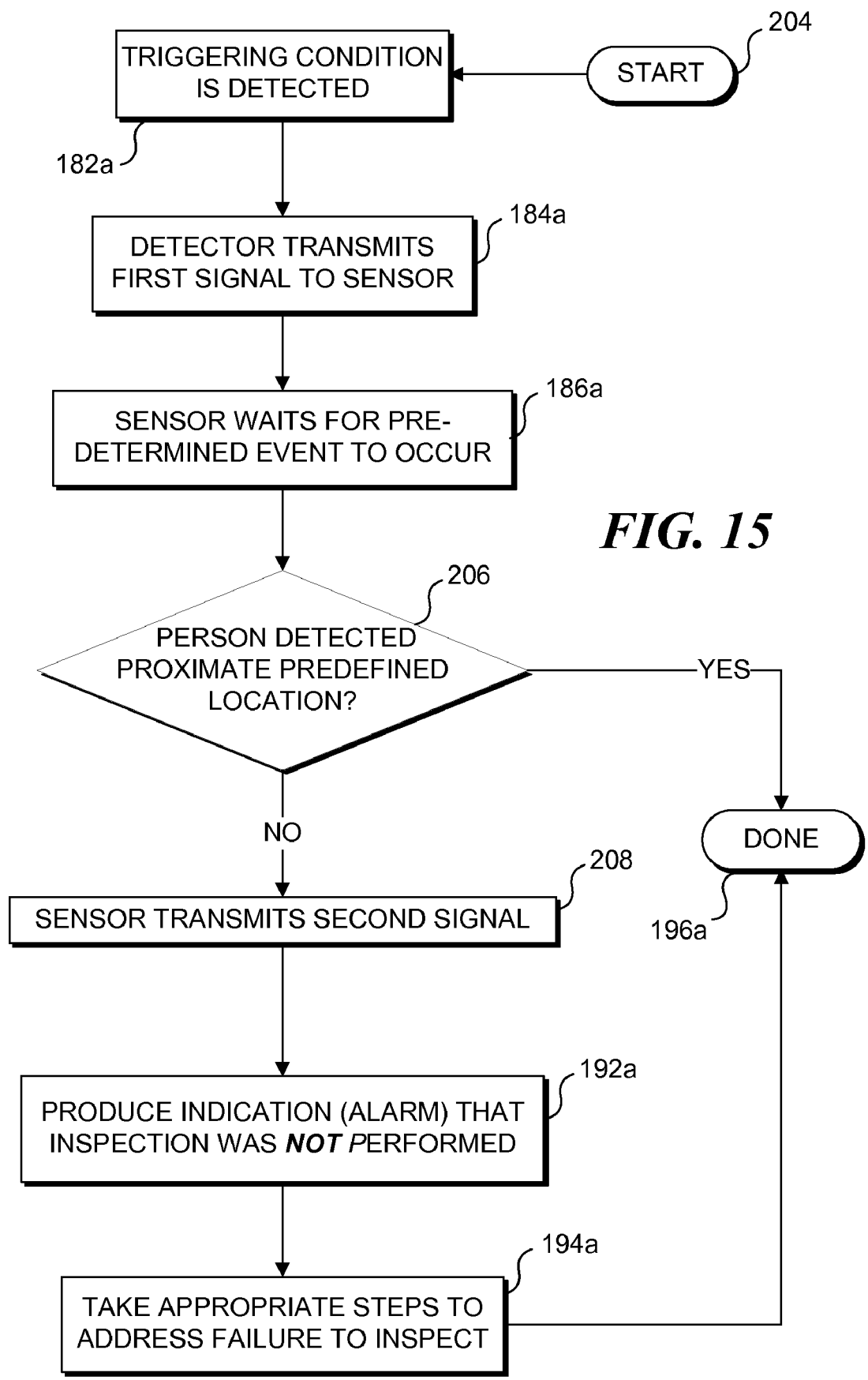

FIGS. 14A, 14B, and 14C are flow charts showing the steps implemented in the present invention to determine whether an inspection was likely performed, wherein a first signal is transmitted to a monitor to indicate the beginning of a period of time in which the inspection is to be performed, and a second signal is sent to the monitor after a sensor has indicated that a person was physically present in an inspection area to perform the inspection; and FIG. 15 is a flow chart showing the steps implemented in the present invention to determine whether an inspection was likely performed, wherein a first signal is transmitted to a sensor to indicate the beginning of a period of time in which the inspection is to be performed, and a second signal is sent to a monitor only if the sensor has received the first signal, a predetermined event corresponding to the end of the period of time for the inspection has occurred, and the sensor has not determined that a person was physically present in an inspection area to perform the inspection.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Applicability of the Present Invention

The present invention is applicable to verifying whether a person was in a position to perform an inspection within a period of time designated for the inspection to occur. The present invention is particularly well suited to pre-trip inspections, or post-trip inspections, of any conveyance device that carries one or more passengers (or cargo). This invention can provide evidence that a person who is intended to make the inspection was actually physically present at a predefined location associated with the vehicle, where such a location corresponds to a part of the vehicle that requires inspection.

For example, the predefined location might be the rear of a school bus, so that the person must move through the vehicle along a path that would enable an inspection to be done. The invention does not actually confirm that the person looked for all conditions that are to be checked during the inspection, but at least, can confirm that the person was likely to have performed the inspection. For time critical inspections, the invention can also ensure that the person reached the predefined location within a predetermined time interval after a triggering condition (such as the arrival of the vehicles at a designated location, or the powering up or powering down of the vehicle) has been detected. Moreover, the invention is applicable to ensuring that inspections are likely to have been performed on trains, buses, vans, cars, aircraft, water vessels, ferries, cargo containers, cargo vessels, and any other device in which freight or people are conveyed between two points. The purpose of the inspections may be for safety, maintenance, security, or other reasons. A particularly important motivating factor for developing this invention was to provide a system useful to ensure that a school bus was checked for students who might have failed to disembark at a usual stop, and who remain on the school bus at the end of the route. Thus, while a specific preferred embodiment described herein is a system and method configured to verify that a post trip inspection of a school bus has been performed, it should be understood that the present invention is not limited to post trip inspections, or inspections only in school buses. The present invention can be implemented in regard to any type of transportation or shipping vessel, as well as to inspections unrelated to vehicles. Furthermore, the present invention can be applied to pre-trip inspections and to verify that a person was in a position to perform a required inspection during a trip. While many trips are of short duration and no in-trip inspection is required or reasonable, many trips associated with marine vessels (such as cruises, or the delivery of cargo) are of long duration. During such a trip, the present invention can be employed to verify whether required inspections of the vehicle were likely performed. Further, the present invention can be employed in connection with inspections that are not associated with a vehicle, as will be discussed in greater detail below.

The present invention can store data providing evidence that a person reached the predefined location associated with the vehicle. While the data accumulated with the present invention are not conclusively presumptive evidence that the person carefully carried out the inspection, in most cases, if the person is required to visit a predefined location, e.g., at the rear of the vehicle interior, it is very likely that the person will actually do the inspection. By encouraging the person making an inspection to be physically disposed to carry out an inspection, and by providing evidence of that fact in the data recorded, there should be at least a justifiable presumption that the person actually did the inspection.

Figure 1:
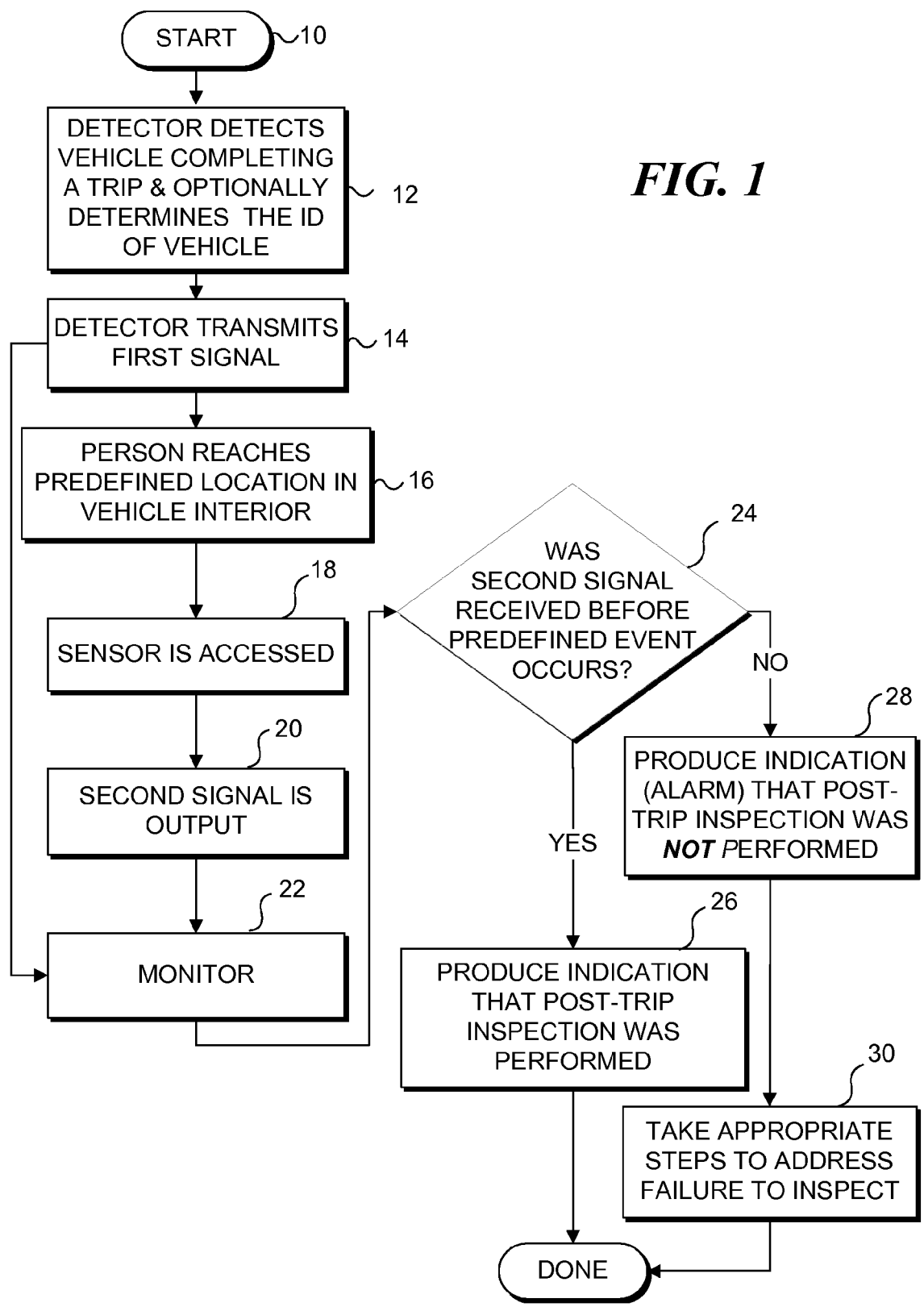
FIG. 1 is a flow chart showing the steps followed in the present invention to ensure that a post-trip inspection of a vehicle interior was likely performed.

FIG. 1 illustrates the overall, logical steps implemented in connection with the present invention and is applicable to embodiments of the invention in which a post-trip inspection of the interior of a vehicle is required (for example, inspecting a school bus to ensure no child has been left in the bus). From a start block 10, a step 12 provides that a detector detects a vehicle completing a trip and optionally, determines the identification of the vehicle. Details of how this step can be carried out are described below. The detector transmits a first signal (to a monitor), either by wire or wirelessly, in a step 14, to indicate that the vehicle being detected has completed a trip. At some time after the transmission of the first signal, a person should begin to move towards a predefined location in the interior of the vehicle that is to be inspected, reaching the predefined location, as noted in a step 16.

This predefined location can be anywhere on the interior of the vehicle, but preferably is selected so that in order to reach the predefined location, a person has to move through the interior of the vehicle to a position where the person should visually perceive a condition of the vehicle, or any other person or any package or parcel remaining in the vehicle. Alternatively, the predefined location can be disposed within a portion of the vehicle that requires a post-trip inspection, such as a cargo hold. For example, as described below, a school bus that has just finished its run for the day should be inspected for safety and maintenance issues, but more importantly, to ensure that no children remain on board. If the predefined location is located at the rear of the school bus, it is very likely that the school bus driver will notice if there are children remaining on board if the driver proceeds to the back of the bus along the central aisle. In contrast, if the conveyance is an airplane having multiple overhead storage bins that need to be inspected, the person should be required to move down the aisle to the rear of the aircraft while inspecting each of the bins. In this scenario, the person needs to individually inspect each cargo bin and each seating row to make sure that all articles have been removed so that there are no unauthorized articles (or passengers) remaining onboard. A person might be required to enter a cargo hold to inspect it for unauthorized packages or to detect damaged cargo that might have shifted during a flight. Those of ordinary skill will understand that the post-trip inspection can be for many reasons other than the exemplary ones noted above.

It is also important that the term "post-trip inspection" not be interpreted in a limiting fashion. As used herein and in the claims that follow, this term is intended to encompass the arrival of a vehicle at any designated location where an inspection is intended to be carried out by a person. The person can be an operator of the vehicle or any other person who has been assigned the responsibility for making such an inspection.

Once the person reaches the predefined location, as noted in step 16, the person should access a sensor in a step 18, causing a second signal to be output, as shown in a step 20. The sensor can take different forms, as discussed below. Both the first signal and the second signal will be provided to a monitor as shown in a step 22. The second signal can be provided by storing data indicating that the sensor was accessed, and subsequently downloading the data to the monitor, by transmitting the second signal as an RF signal. The second signal is thus conveyed to the monitor over either a wireless communication link or a wired communication link.

Next, a decision step 24 determines whether the person completed the post-trip inspection of the vehicle before a predefined event occurs. The predefined event may be a lapse of a certain interval of time after detecting that the vehicle completed the trip. For example, a person may be given 15 minutes to reach the predefined location from the time that the detector detected that the vehicle completed the trip. The predefined event can also be a lapse of a predetermined time after powering off the vehicle. For instance, a person may only have five minutes to reach the predefined location after the vehicle is powered off. Or the predefined event can be the activation of a switch that is external to the vehicle. For example, in order to be paid for working that day, a driver who has completed a trip and is checking out may be required to insert a time card into a time clock (to be stamped with the current time), which activates a switch signaling the occurrence of the predefined event. In a step 26, if the monitor receives the second signal before the predefined event occurs, then the monitor will do nothing, or more preferably, will produce an indication that the post-trip inspection was performed. Conversely, in a step 28, if the monitor does not receive the second signal before the predefined event occurs, then the monitor will produce an alarm indication that the post-trip inspection was not performed. The alarm can be visual, audible, or both and may also include display of a message on the monitor indicating which vehicle has not been inspected as required. Once this indication is produced, appropriate steps can be taken to address the failure of the person to complete the post-trip inspection properly, in a step 30. For example, a school bus that was not inspected properly will be inspected by management or administrative personnel, to ensure that any child or package remaining on the bus is found. The process is then complete.

Figure 2A:
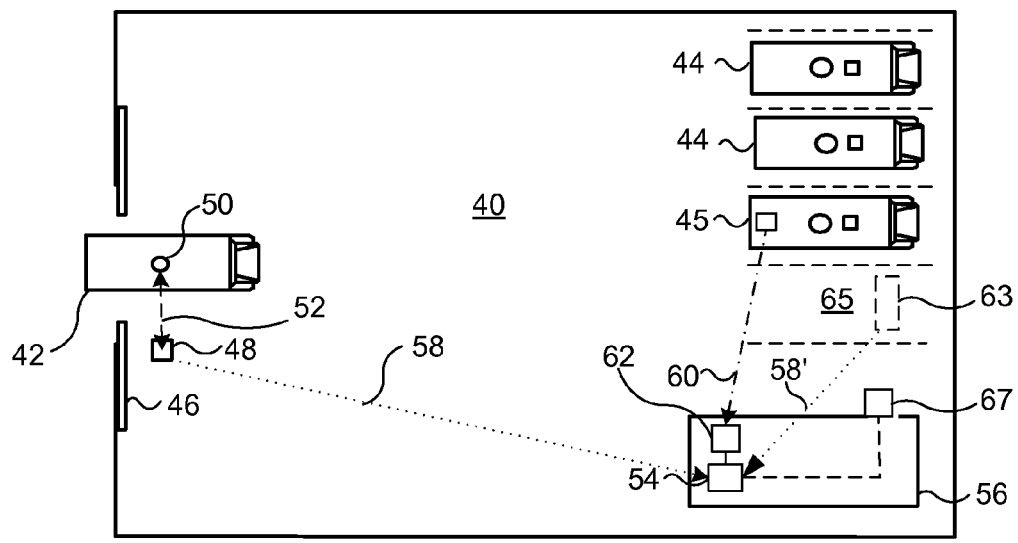
FIG. 2A is a schematic plan view of a school bus returning to a school bus yard where a post-trip inspection of the school bus is required and illustrates components employed to detect the return of the school bus and its identification.

FIG. 2A illustrates how the present invention is employed in connection with a bus arriving at an end of its route. As shown in this Figure, a school bus 42 is pulling into a school bus yard 40 where the school bus is due for a post-trip safety and security inspection. For example, this post-trip inspection will be repeated at the end of the day in the school bus yard after all of the school children have been dropped off at their respective bus stops. The term "school bus yard" is used herein to encompass an area where one or more school buses are temporarily stored when not in use, e.g., over night or on weekends, etc. The school bus yard is just one example of a location where some type of scheduled event such as a maintenance inspection, a safety inspection, vehicle refueling, vehicle cleaning, and/or vehicle loading and unloading of either passengers or cargo is carried out in regard to a vehicle.

School bus 42 enters the school bus yard through a sliding gate 46. Adjacent to sliding gate 46 is disposed an RF detector 48 that detects school bus 42, as the school bus drives past the open sliding gate at the end of its trip. RF detector 48 can produce an RF signal to query an RFID 50 that is located on school bus 42 to determine its unique identity, based upon changes in the resulting RF signal that is then received by RF detector 48. These bi-directional RF transmissions are shown by a dash line 52. RF detector 48 conveys this information as signal, to a monitor 54 that is disposed in an administrative office 56. The signal that detector 48 sends to the monitor is conveyed over a wired or wireless link, as indicated by shown as a dotted line 58, and is the first signal that monitor 54 receives in connection with school bus 42 reaching the end of its trip at the school bus yard. Alternatively, it will be appreciated that RF detector 48 can simply comprise an RF receiver that responds to an RF signal transmitted from a transmitter on the school bus.

Also shown are school buses 44 that have already had their post-trip inspection performed. In addition, this invention is not limited to verifying that the post-trip inspection has occurred for a newly arrived school bus before another school bus arrives at the gate. For instance, immediately after the detector has detected school bus 42, another school bus may be pulling though the gate and will similarly be detected and preferably identified.

Those skilled in the art will recognize that the positions of RF detector 48 and RFID 50 (or the RF transmitter) are interchangeable. For example, when school bus 42 pulls into the school bus yard through gate 46, RF detector 48 detects that a specific school bus has completed a trip. Instead, the RF detector can be located on the school bus (rather than fixedly mounted near the sliding gate in the school bus yard) and can then query the RFID that is now located in the yard (rather than on the school bus), but this approach will not determine the unique identity of the school bus.

It is also contemplated that many other types of detectors could be used in place of the RF detector and RFID (or transmitter) described above, so long as the detector conveys a first signal over either a wireless communication link or a wired communication link to the monitor to at least detect the arrival of the school bus in the school yard. For example, the detector may be a pressure plate 63 that is embedded in the sliding gate entrance or under an assigned stall 65 where the school bus is parked after completing its trip, such that the weight of the school bus triggers this pressure sensitive plate, producing the first signal conveyed to monitor 54, as indicated by dot line 58'. The sensitivity of this pressure plate would be selected to only detect a school bus and not other lighter weight vehicles, particularly, if the pressure plate is disposed at the sliding gate. By using pressure plate 63 in an assigned stall, the likely identity of the school bus being parked in that stall will be indicated to monitor 54. The detector may be also comprise one or more light sensors, such as a photocell that detects reflected from the school bus or detects the interruption of light from a suitable source and is placed strategically to detect a school bus as it completes its trip, but not smaller vehicles. While conventional light detectors can identify that a school bus has completed a trip, they cannot identify a specific school bus that has completed the trip. However, a light detector that detects an encoded pattern such as a bar code that is applied to a side of the school bus, using reflected light from the encoded pattern, could be used to identify a specific school bus completing its trip. A further possible type of detector comprises a video camera disposed proximate the area where the school bus completes its trip. The video camera would be used to produce an image of a license plate or a visual identification number applied on the side or the top of the exterior of the school bus, which with appropriate optical character recognition software used to process the image, would enable the arrival of a specific school bus in the school bus yard to be detected.

FIG. 2A also illustrates a second signal that is sent to receiver 62 located in the school bus yard office, as illustrated by a dash-dot line 60. It originates, for example, from a portable device (not shown) that is being used proximate the rear of the interior of a school bus 45 that has just been parked. The details of the portable device will be described in conjunction with FIG. 4 and FIG. 5. Returning to FIG. 2A, this second signal is emitted by the portable device if the person making the post-trip inspection has moved through the interior of school bus 45 carrying the portable device to the predefined location within the school bus where a token (not shown) is disposed. The token (e.g., an RFID) is read by the portable device, which thus serves as a sensor of the token. The portable device includes a transmitter that sends the signal to a receiver 62. Receiver 62 then produces an output that is coupled to monitor 54. This output in response to receipt of the second signal will preferably include the unique identification of the vehicle and a confirmation that the token was read, actuating the portable device to transmit the second signal. Although it cannot be guaranteed that a person actually carried out the post-trip inspection, if the person has had to move through the interior of the school bus to a predefined location near the rear of the school bus interior and be physically disposed adjacent to the token, it is likely that the person will have done the inspection, either at the predefined location or along the route the person moved to reach the predefined location.

The monitor now utilizes reception of the first signal and the receiver output to determine the status of the post-trip inspection. If the person has reached the predefined location and (as described above) has employed the portable device to transmit the second signal to the receiver before a predefined event occurs, the monitor will preferably display a status message (not shown) and record data to indicate that the post-trip inspection was likely completed as desired. For example, the monitor may display a message that "School bus 45 has been likely been inspected" or "School bus 45 appears to be in compliance with post-trip inspection requirement."

Conversely, if the person has not reached the predefined location and employed the portable device to transmit the second signal to receiver 62 before the predefined event occurs, the monitor will display a status message (not shown) to indicate that the post-trip inspection was not completed as desired and will store data to that effect. More likely, the monitor may be coupled to an alarm system 67, as shown in FIG. 2A, to produce either an audible or visual alarm, e.g., using a claxon horn (not shown) mounted in the school yard, or the bus may have an audible alarm that is triggered by the monitor. The monitor may also itself emit a visual alarm in the form of blinking or flashing lights or there may be blinking or flashing lights on alarm system 67, which is mounted in the schoolyard. In addition, the monitor may cause the school bus lights to blink or flash to provide an alarm indication. Regardless of the method selected to sound the alarm, the alarm should be heard and/or be visible outside the school bus such that the alarm indication will alert persons in the vicinity where a post-trip inspection should have been done that the post-trip inspection was not properly performed. For example, it is critical that if there is a child left on the school bus, the child be promptly found and steps taken to transport the child to an appropriate guardian. Similarly, there might be unauthorized articles left behind on the school bus that should be returned to a rightful owner, or which could pose a danger, and these unauthorized articles should be found and disposed of properly.

Figure 2B:
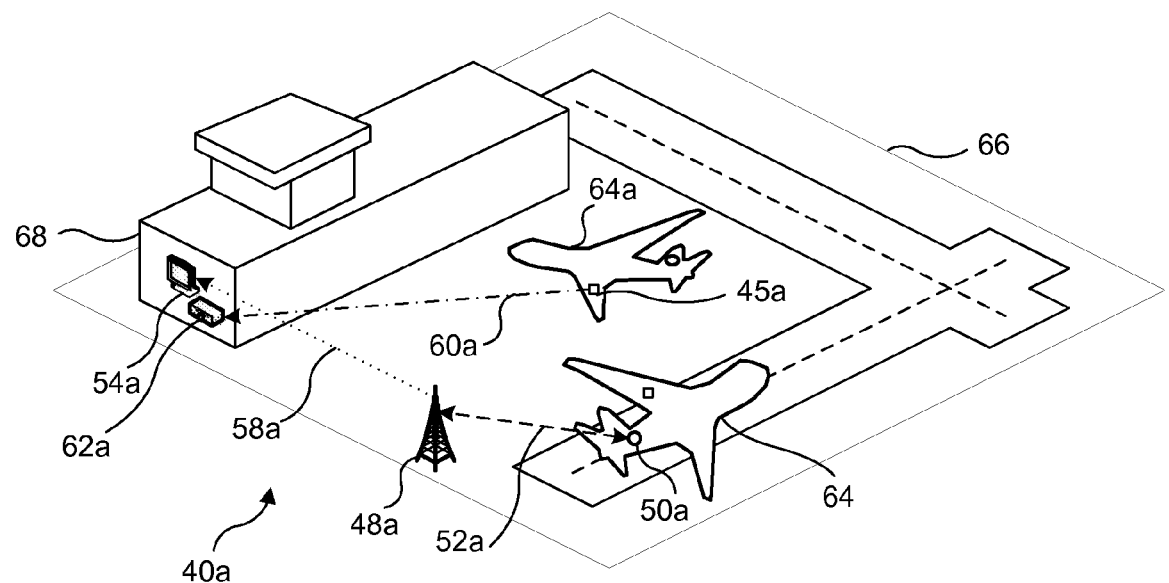
FIG. 2B is an isometric view of an airport and showing an airplane landing at the airport where a post-trip inspection is required, to illustrate another type of vehicle with which the present invention is usable.

FIG. 2B illustrates an application of the present invention in an airport 66. As described above, the invention is not limited to vehicles that convey passengers on wheels over pavement, it may be applicable to airplane post-trip inspections. An airplane 64 is illustrated in FIG. 2B after just landed at airport 66 and prior to taxiing to an airport terminal 68. An airplane 64a is parked and has just had its post-trip inspection performed. An RF detector 48a queries an RFID 50a that is located on airplane 64 to determine its unique identity. These transmissions between the RF detector and RFID are shown by a dash line 52a. RF detector 48a subsequently conveys this information to a monitor 54a that is located in the airport terminal. This signal that detector 48a sends to the monitor corresponds to a first signal indicating the arrival of airplane 64 at the airport, as it completes its trip.

FIG. 2B also illustrates a second signal indicated by a dash-dot line 60a that is sent to a receiver 62a located in the airport terminal. This second signal is transmitted by the portable device (not shown) that is carried on the airplane after reading a token 45a that is on the aircraft in a predefined location. In a manner similar to the exemplary school bus application of the present invention illustrated in FIG. 2A and discussed above, this second signal is emitted if the person has moved through the interior of the airplane to the predefined location within the airplane where token 45a is disposed and reads the token with the portable device. The portable device has a transmitter and responds to reading the token sending the second signal to receiver 62a. Receiver 62a then produces an output in response to receipt of the second signal, and the output is coupled to monitor 54a. This output will include the unique identification of the airplane and a confirmation that the token was read.

The monitor then uses the reception of the first signal and the receiver output to indicate the status of the post-trip inspection. If a person has reached the predefined location and used the portable device to read the token so that the portable device transmits the second signal to the receiver before a predefined event has occurred, the monitor will preferably either produce a written status message (not shown) to indicate that the post-trip inspection was completed and store that information as data, or simply do nothing. For example, the monitor message or printout may read "Airplane 64a has been inspected," or "Airplane 64a is in compliance."

Conversely, if a person has not reached the predefined location and enabled (as described above) the portable device to transmit the second signal to the receiver before the predefined event has occurred, the monitor may produce a written status message (not shown) to indicate that the post-trip inspection was not completed, and may also cause an alarm indication that alerts appropriate other personnel to take steps appropriate to address the failure of the post-trip inspection to be properly completed.

Figure 3A:
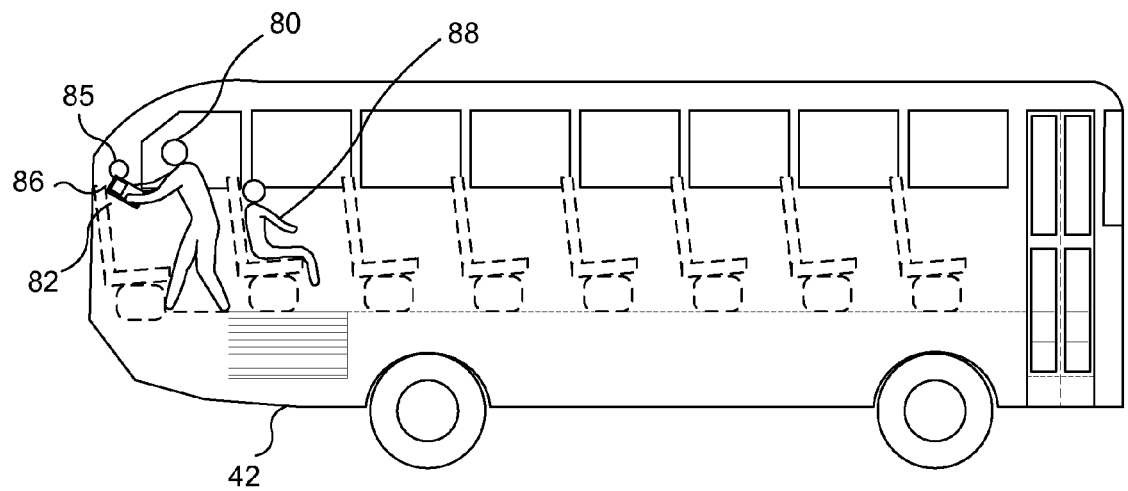
FIG. 3A is a side elevational cut-away view of a school bus, illustrating the disposition of a token adjacent to a rear of the bus accessed to ensure that a person has walked through the bus and nominally inspected all of the seats to determine whether all children have been unloaded from the bus.
Figure 5:
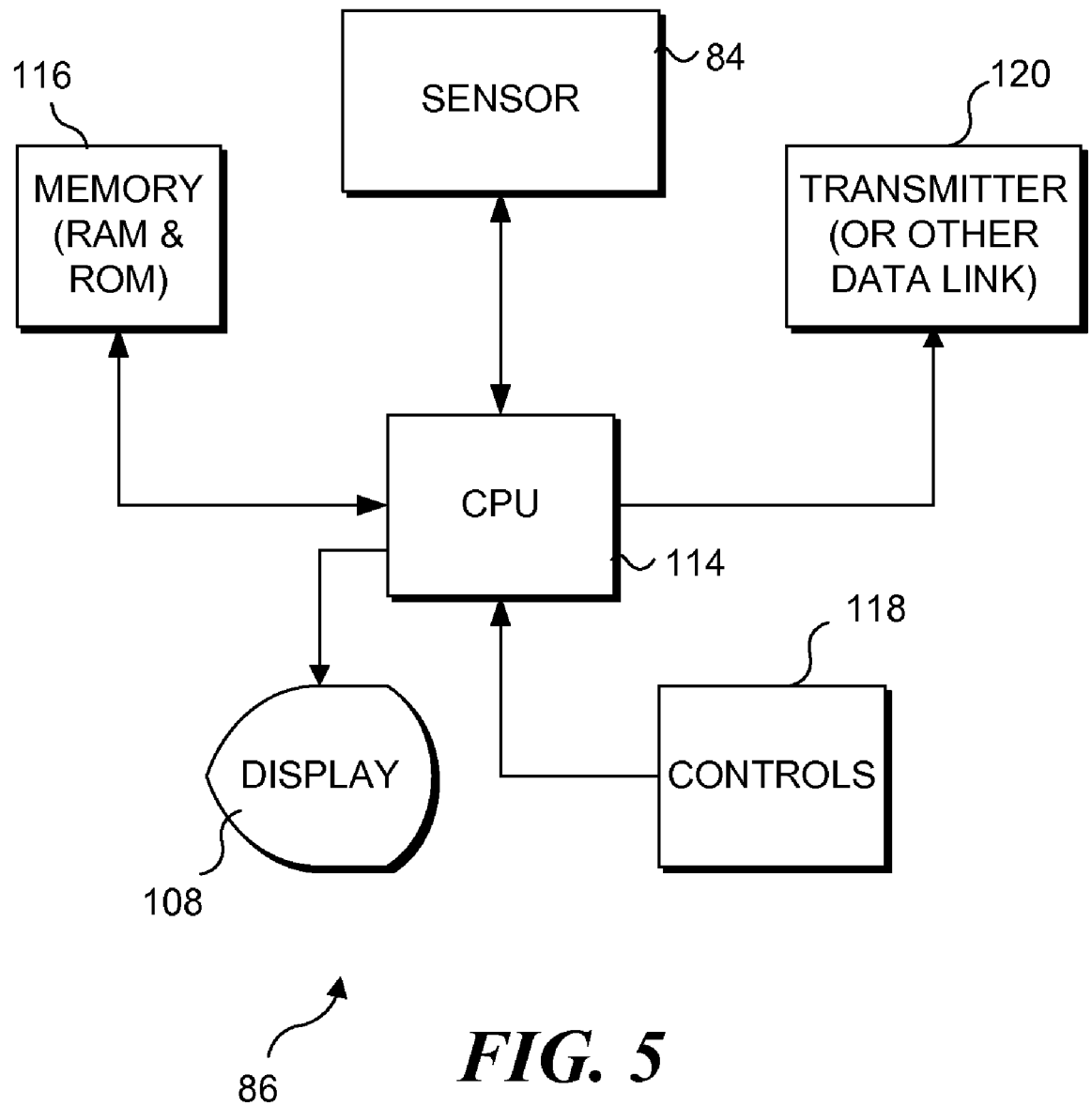
FIG. 5 is a schematic block diagram of the functional components included in the portable device of FIG. 4.

FIG. 3A is an illustration showing a post-trip inspection in the interior of the school bus in accord with one preferred embodiment of this invention. As explained above, post-trip inspections may be made for security reasons, e.g., to either ensure that only authorized passengers remain in the vehicle, or to ensure that no unauthorized packages remain in the vehicle, or to check on the safety of vehicle components and/or maintenance. In the illustration of FIG. 3A, school bus 42 has completed its run for the day, and a person 80 is making a post-trip inspection to check for any child 88 who remains on the school bus. The child may still be on the school bus because of being asleep, mentally disabled, or may have failed to unload at an appropriate bus stop because of uncertainty, or for some other reason. A predefined location 82 in this preferred embodiment is at the back of the bus where a token 85 is disposed. Person 80 is instructed via at least one prompt on a portable device 86, which is being carried by the person, to look for children who may still be on the bus. Thus, as person 80 walks from the front of the bus to the rear along the central aisle, the person can visually perceive whether a child 88 is present in any of the seats on the bus. When the person reaches the rear of the bus, the person moves portable device 86 within a predefined range of token 85. A sensor 84 (which is shown in FIG. 5) on portable device 86 responds to token 85 when the portable device is held less than the predetermined distance from the token, recording data indicating that the person had moved to a position that would enable the person to readily inspect the interior of the bus for any child 88, who remained on the bus after the route had been completed. Portable device 86 also includes a transmitter 120 (also shown in FIG. 5), and when it reads token 85, will send a signal to receiver 62, as shown in FIG. 2A.

In this preferred form of the present invention, the token that is preferably employed is a radio frequency identification (RFID) tag that is attached with a fastener or an appropriate adhesive to a point near the predefined location within the interior of the bus or other vehicle. One type of RFID tag that is suitable for this purpose is the WORLDTAG™ token that is sold by Sokymat Corporation. This tag is excited by an RF transmission from portable device 86 via an antenna (not shown). In response to the excitation energy received, the RFID tag modifies the RF energy that is received from the antenna in a manner that specifically identifies the vehicle associated with the RFID tag, and the modified signal is detected by sensor 84, as shown in FIG. 5.

An alternative type of token that can also be used in this invention is an IBUTTON™ computer chip, which is armored in a stainless steel housing and is readily affixed to a frame or other portion of the vehicle, adjacent to the predefined location that the person is supposed to reach when performing the post-trip inspection. The IBUTTON chip is programmed with JAVA™ instructions to provide a recognition signal when interrogated by a signal received from a nearby transmitter, such as from an antenna on portable device 86. The signal produced by the IBUTTON chip is received by sensor 84, which determines the identification of the vehicle associated with the token. This type of token is less desirable, since it is more expensive, although the program instructions that it executes can provide greater functionality.

Yet another type of token that might be used is an optical bar code in which a sequence of lines of varying width encode light reflected from the bar code tag. Other types of light reflective or light absorbing optical patterns can alternatively be employed. The encoded reflected light is received by sensor 84, which in this embodiment, comprises an optical detector. Optically encoded pattern recognition technology is well understood in the art and readily adapted for identifying a particular vehicle. One drawback to the use of an optically encoded tag as a token is that the optically encoded pattern can eventually become covered with dirt or grime that must be cleaned before the encoded pattern can be properly read. If the optically encoded pattern is applied to a plasticized adhesive strip, it can readily be mounted to any surface and then easily cleaned with a rag or other appropriate material.

Yet another type of token usable in the present invention is a magnetic strip in which a varying magnetic flux encodes data identifies the particular vehicle associated with the token. Such magnetic strips are often used in access cards that are read by readers mounted adjacent to doors or in an elevator that provides access to a building. However, in the present invention, sensor 84 on portable device 86 comprises the magnetic flux reader. The data encoded on such a token are readily read as the portable device is brought into proximity of the varying magnetic flux encoded strip comprising the token.

As yet another alternative, an active token can be employed that conforms to the BLUETOOTH™ specification for short distance data transfer between computing devices using an RF signal. However, it is likely that the range of the signal transmitted by the token would need to be modified so that it is substantially less than that normally provided by a device conforming to the BLUETOOTH specification. It is important that the portable device be able to detect that it is proximate the component only within a predetermined maximum range selected to ensure that the operator is positioned to actually carry out an inspection of the component.

As a further alternative, it will be appreciated that the token can be carried to the predefined location by person 80, where a fixed reading device is installed, so that the hand carried token is then read by the reading device. Any of the various types of tokens discussed above can be hand carried by the person. This approach is less desirable, since it would be preferable to use a portable device to read other tokens on in the vehicle, for example, when carrying out a safety inspection of various components of the vehicle. Each token is associated with a different component that should be inspected, and the portable device stores data confirming that each component was visited and preferably an indication of any problem observed in connection with a component thus inspected.

Figure 3B:
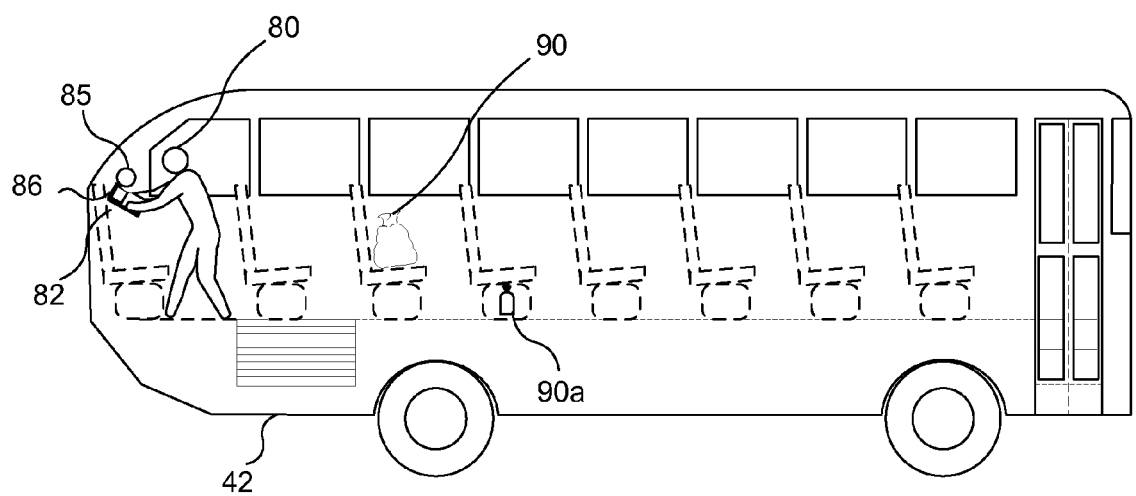
FIG. 3B is a side elevational cut-away view of a school bus, illustrating how the present invention is used to ensure that a person has moved through the interior of the bus to access the token and has thus likely inspected all of the seats to determine whether any unauthorized articles have been left on the bus.

FIG. 3B illustrates a post-trip inspection of the school bus for another purpose in the first preferred embodiment. Person 80 is instructed via at least one prompt on portable device 86 to look for any unauthorized items left on the bus such as knives or other weapons, chemicals (e.g., mace or pepper spray), explosives, matches, or any other undesirable article. Also detected in such an inspection would be any packages or articles inadvertently left behind by a passenger who rode the school bus. As person 80 walks to the back of the school bus to reach predefined location 82, the person can see any unauthorized packages 90 and 90*a* still remaining on the bus. When the person reaches the back of the bus, the person moves portable device 86 within a predefined range of token 85. Portable device 86 detects and responds to token 85, recording data indicating that the person had moved to a position along a route that should have readily permitted the person to inspect the bus for unauthorized packages left behind. Portable device 86 also has a transmitter, and when token 85 has been read, will send a signal to receiver 62, as shown in FIG. 2A.

Figure 4:
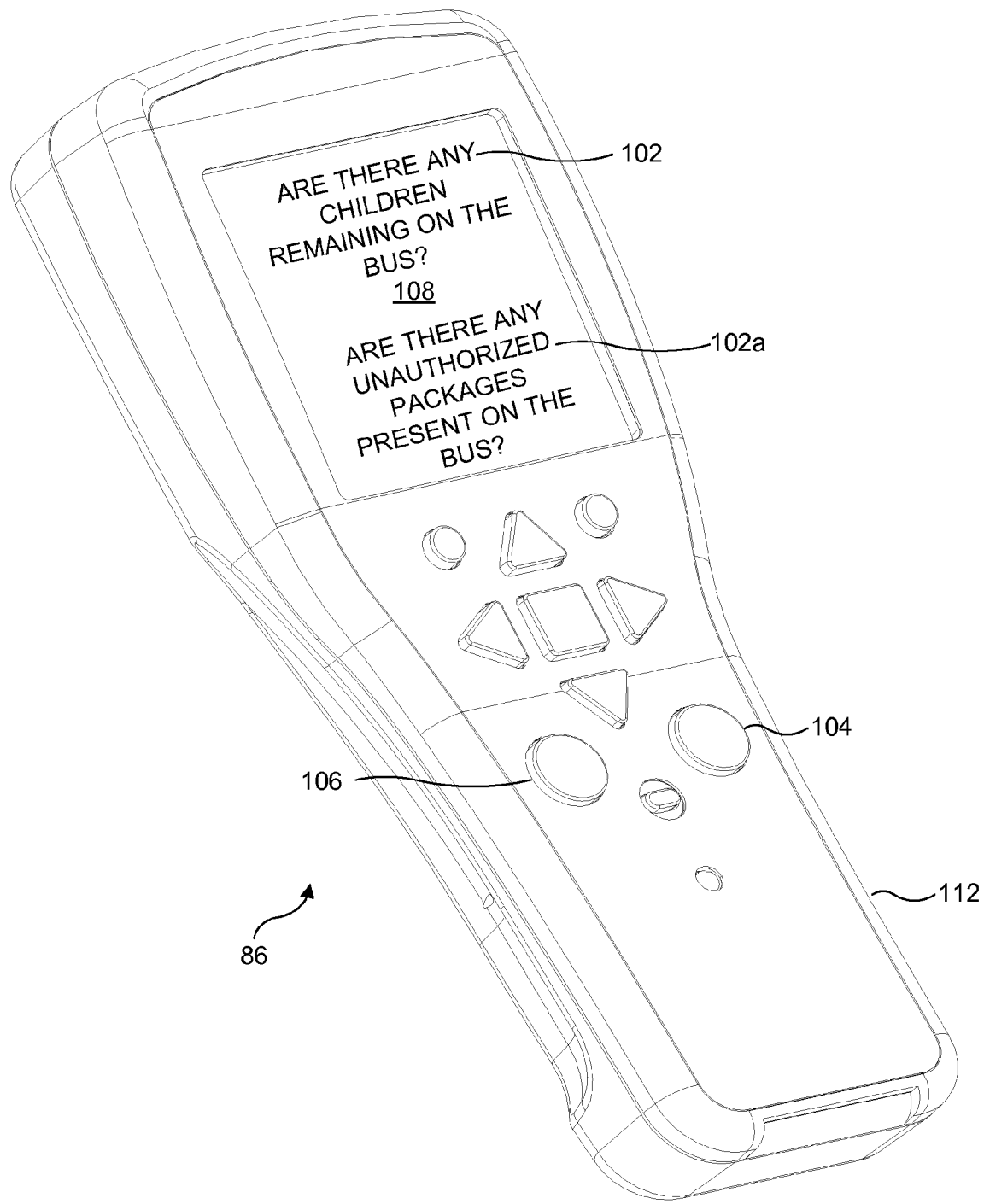
FIG. 4 is an isometric view of the upper surface of the portable device used for responding to a token, illustrating examples of prompt messages for the person who is performing the post-trip inspections.

FIG. 4 is an illustration of portable device 86 and shows two exemplary prompt messages that may be displayed to direct the person performing the post-trip inspection to look for specific items. For example, before beginning the post-trip inspection indicated in FIG. 3A, person 80 receives a prompt message 102 as shown in FIG. 4, which reads, "Are there any children remaining on the bus?" In response to this prompt, person 80 can depress a control 104 to indicate "Yes" on the portable device, since child 88 remains on the bus, as shown in FIG. 3A. Or during a different post-trip inspection, if all children have unloaded at their appropriate bus stop, the person can depress a control 106 to indicate "No"—there are no children remaining on the bus.

In regard to the post-trip inspection shown in FIG. 3B, before beginning the post-trip inspection, person 80 might receive a prompt message 102*a* on screen 108 of portable device 86 as shown FIG. 4, "Are there any unauthorized packages present on the bus?" In response to this prompt, person 80 can depress control 104 to indicate "Yes" on the portable device, since unauthorized packages 90 and 90*a*, as shown in FIG. 3B, remain on the bus. Or during a different post-trip inspection, if no articles have been left behind on the bus, the person can depress control 106 to indicate, "No," there are no articles left on the bus.

Those skilled in the art will recognize that many other different prompts may be displayed on the portable device's screen and thus, the prompts are not limited to those exemplary messages shown in FIG. 4. In addition to the "Yes" or "No" response that the person can give, as illustrated in FIG. 4, sub-menus of dependent prompts (not shown) based on the initial prompts 102 and 102*a* may direct the person to answer additional questions concerning the post-trip inspection.

FIG. 5 illustrates the functional components that are included in portable device 86, either on or inside housing 112, which is shown in FIG. 4. A central processing unit (CPU) 114 comprises the controller for portable device 86 and is coupled bi-directionally to a memory 116 that includes both random access memory (RAM) and read only memory (ROM). Memory 116 is used for storing data in RAM and machine instructions in ROM, which control the functionality of CPU 114 when executed by it. CPU 114 is also coupled to receive operator input from controls 118, such as control 104 and control 106, which are shown in FIG. 4. In addition, CPU 114 provides text and graphics to display 108 for displaying the prompts and other messages. Transmitter 120 allows data that have been collected during the post-trip inspection to be transferred either through a wireless RF link, or through a docking station in which the portable device is placed to download stored data.

Figure 6A:
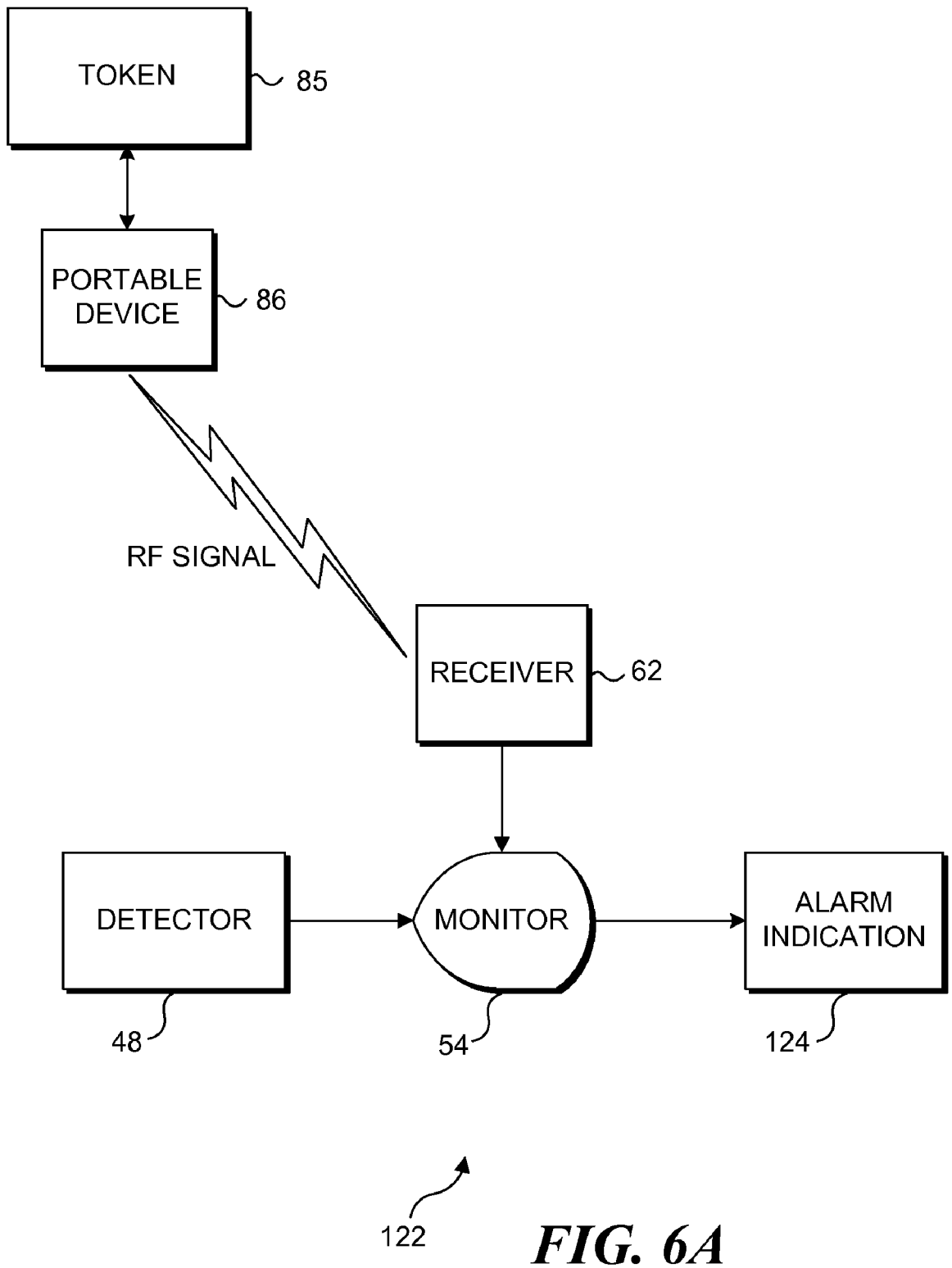
FIG. 6A is a block diagram of components in a first preferred embodiment used to ensure that a post-trip inspection of a vehicle has likely been performed.

FIG. 6A illustrates the functional components 122 that communicate in the first preferred embodiment to enable the monitor to determine whether the post-trip inspection has been performed before a predefined event occurs. Portable device 86 detects and responds to token 85, recording data indicating that the person was in the predefined location and was thus able to readily have performed the post-trip inspection, such as shown in FIGS. 3A and 3B. Transmitter 120 (shown in FIG. 5) can respond to reading token 85 by sending the second signal to receiver 62. Receiver 62 then produces the output that is conveyed to monitor 54. Monitor 54 can then determine whether person completed the post-trip inspection of the vehicle before the predefined event occurred, since it also receives the first signal from detector 48. If, after the monitor received the first signal, the second signal was received as an RF signal by receiver 62 before the predefined event occurred, then the monitor will produce an indication that the post-trip inspection was performed in the desired manner. But, after the monitor receives the first signal, if the second signal is not received before the predefined event occurs, the monitor indicates that the post-trip inspection was not performed and produces an alarm indication 124.

Figure 6B:
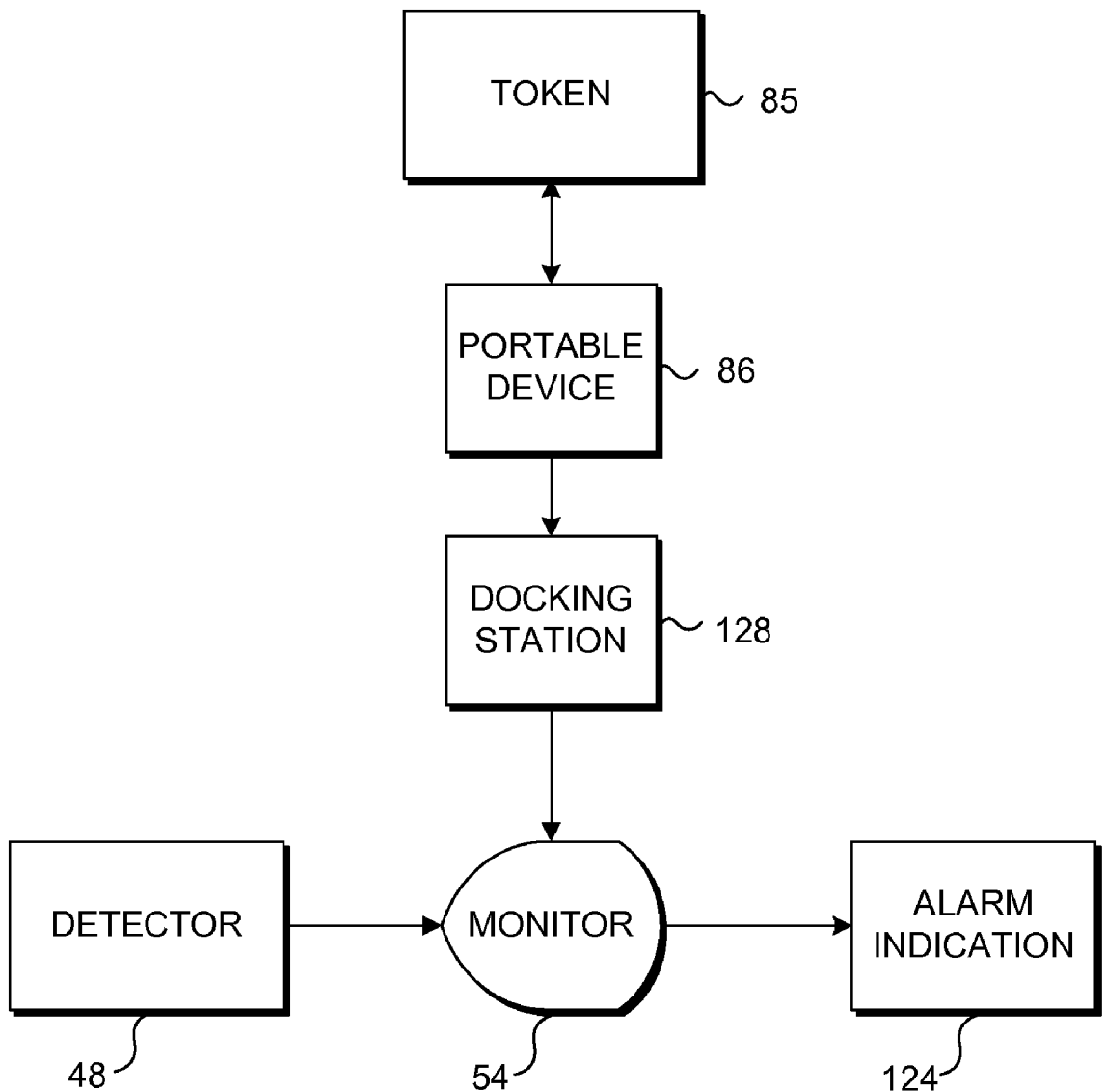
FIG. 6B is a block diagram for an alternative to the first preferred embodiment of FIG. 6A.
Figure 7:
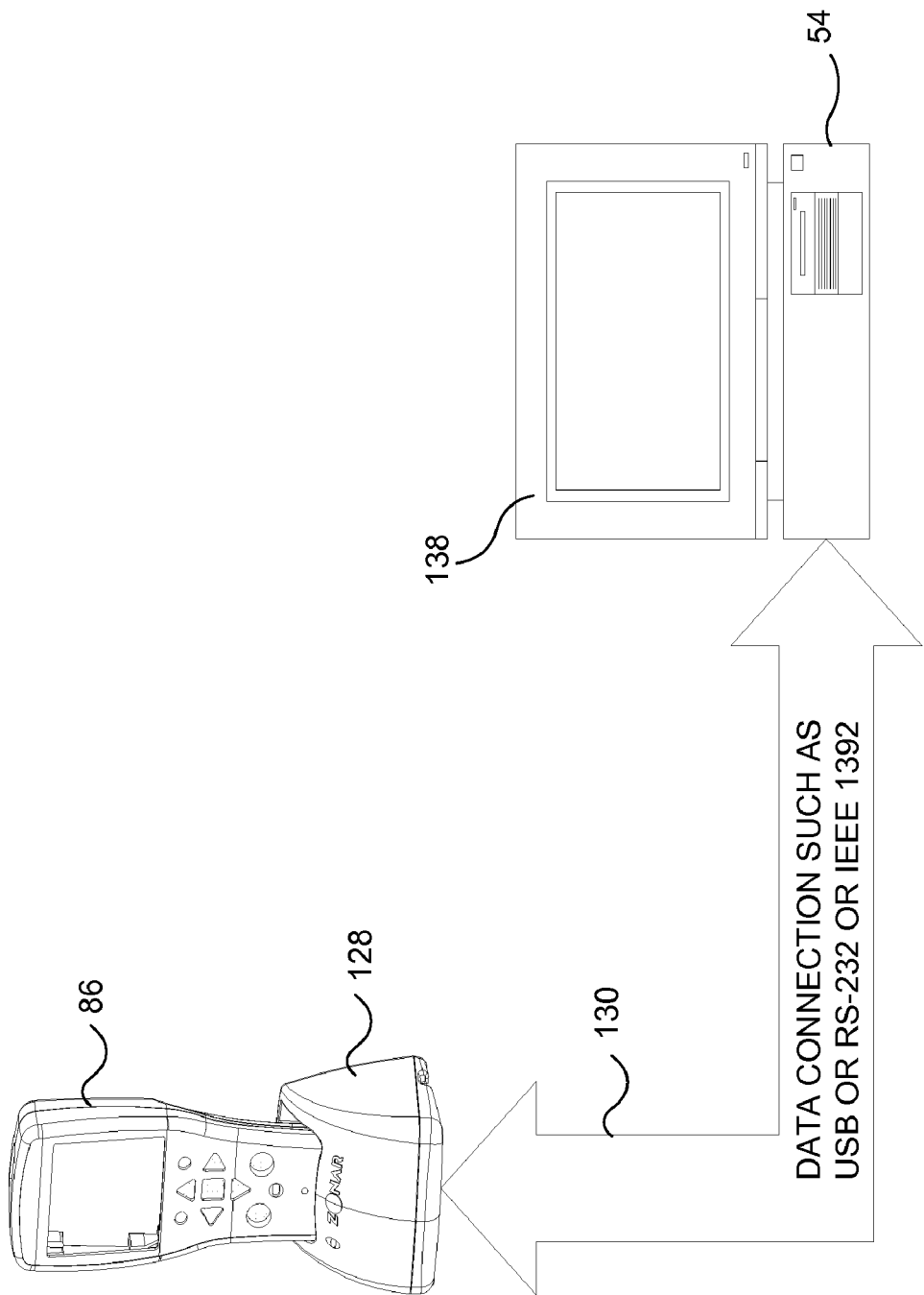
FIG. 7 is a schematic block diagram showing how data stored in the portable device can be alternatively downloaded using a docking station connected to a personal computer, which serves as a monitor for the system.

FIG. 6B illustrates an alternative preferred embodiment to enable the monitor to determine whether the post-trip inspection has been performed as desired. Portable device 86 detects and responds to token 85, recording data indicating that the person was in the predefined location and thus, should have readily been able to perform the post-trip inspection, as shown, for example, in FIGS. 3A and 3B. Although portable device 86 has transmitter 120 (shown in FIG. 5) such that when it receives a signal from token 85, it could send the second signal to receiver 62, the second signal can instead be conveyed to monitor 54 by inserting portable device 86 into a docking station 128 that is coupled to the monitor, as shown in FIG. 7. Docking station 128 receives portable device 86 to facilitate downloading the data stored within the portable device. An interface link 130 couples portable device 86 to monitor 54. The interface link conveying the data from portable device 86 can be a universal serial bus (USB) link, a serial RS-232 link, or an Institute of Electrical and Electronics Engineers (IEEE) 1392 link. The docking station may be located inside or close to administrative office 56, as shown in FIG. 2A, or there may be a plurality of docking stations disposed at different locations within the school bus yard. The docking station thus transfers data corresponding to the second signal to monitor 54. The monitor can then determine whether the person completed the post-trip inspection of the vehicle, as described above.

Figure 8:
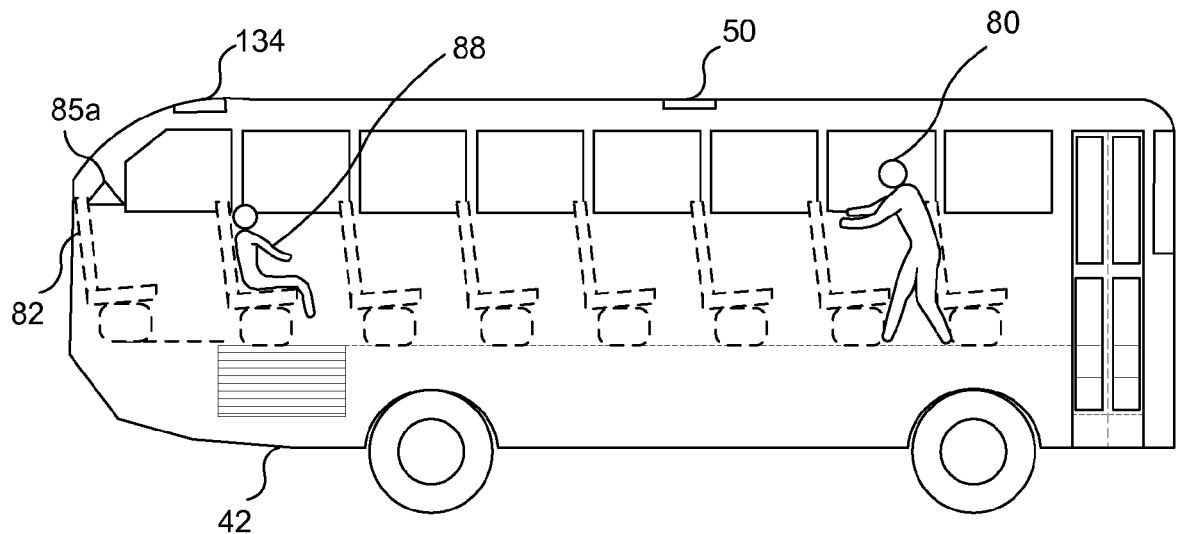
FIG. 8 is a side elevational cut-away view of a school bus, illustrating the disposition of a sensor switch (or optical reader) adjacent to a rear interior of the bus.

FIG. 8 illustrates an example of another preferred embodiment for ensuring a post-trip inspection is likely to be performed, again in regard to school bus 42. Instead of token 85, this embodiment includes a sensor comprising a switch 85a that is disposed proximate predefined location 82 in the school bus. In this embodiment, person 80 does not use the portable reader. Instead, the person walks down the aisle of the bus in order to manually actuate switch 85a before the predefined event occurs. Person 80 is still able to visually perceive that child 88 has remained behind on the bus. But, since there is no portable device present that will act as a transmitter, when person 80 manually actuates switch 85a, a transmitter 134 on the bus is activated to send the second signal to receiver 62. Switch 85a and transmitter 134 may either be coupled to the school bus's battery or may run using a separate power supply (not shown).

Also, those skilled in the art will recognize that still other ways can be employed to sense the user at the predefined location and in response, to transmit the second signal. For example, a sensor can be disposed at the predefined location to read a unique identification code on a device carried by person 80. The sensor can be a bar code scanner or other optical or magnetic scanning device. Also, the person can carry the scanning device to the predefined location to read an encoded pattern affixed there, or can carry a key chain on which the encoded optical or magnetic pattern uniquely identifying the bus or other type of vehicles is attached, so that when scanned, the scanning device will transmit the second signal to the monitor. Transmitter 134 could also be utilized to transmit the second signal in response to a correct identifying code being read at the predefined location.

Figure 9:
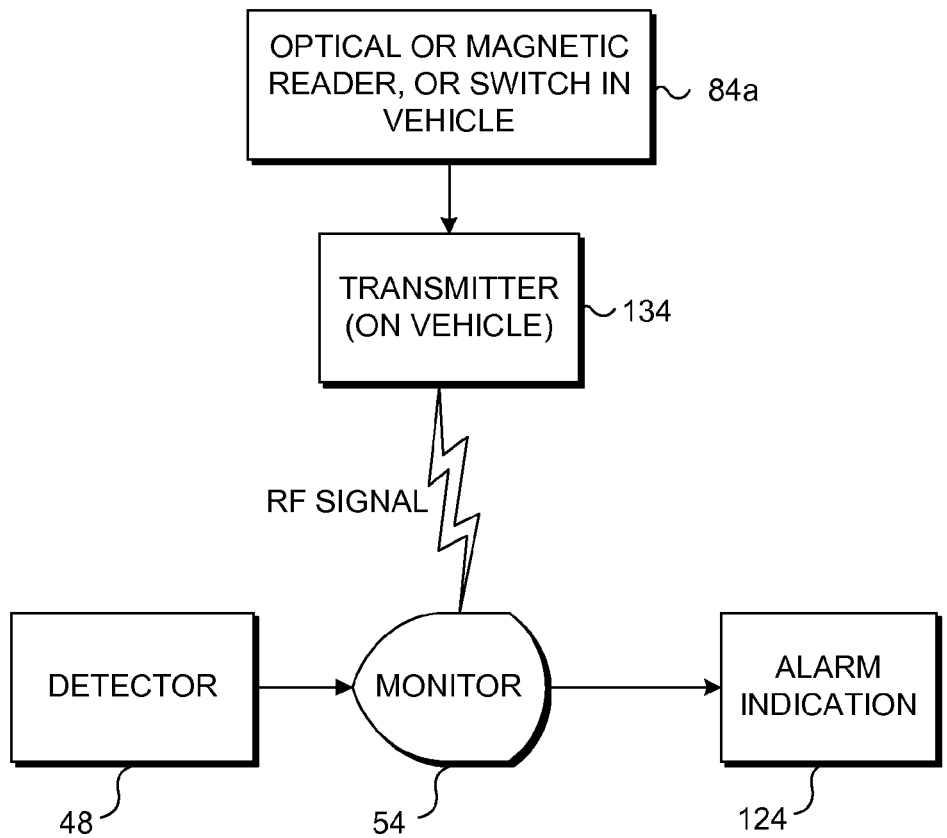
FIG. 9 is a block diagram of a second preferred embodiment of the present invention.

FIG. 9 illustrates how the functional components communicate in the preferred embodiment discussed above. An optical or magnetic reader is used to read an appropriately encoded tag, or even a simple switch is activated to indicate that the person was in the predefined location and was thus able to have readily performed the post-trip inspection. The reader and switch are indicated by a reference number 84a. Transmitter 134 responds to the reader or the switch detecting that the person had reached the predefined location and sends the second signal as an RF transmission to monitor 54. Monitor 54 can thus determine whether the person is likely to have completed the post-trip inspection of the vehicle before a predefined event occurred, since it also has received the first signal from detector 48. If after monitor 54 receives the first signal, the second signal was received from transmitter 134 before the predefined event occurs, then the monitor will produce an indication that the post-trip inspection was performed. Otherwise, monitor produces an alarm indication 124 to indicate that the post-trip inspection has not properly been completed.

Figure 10:
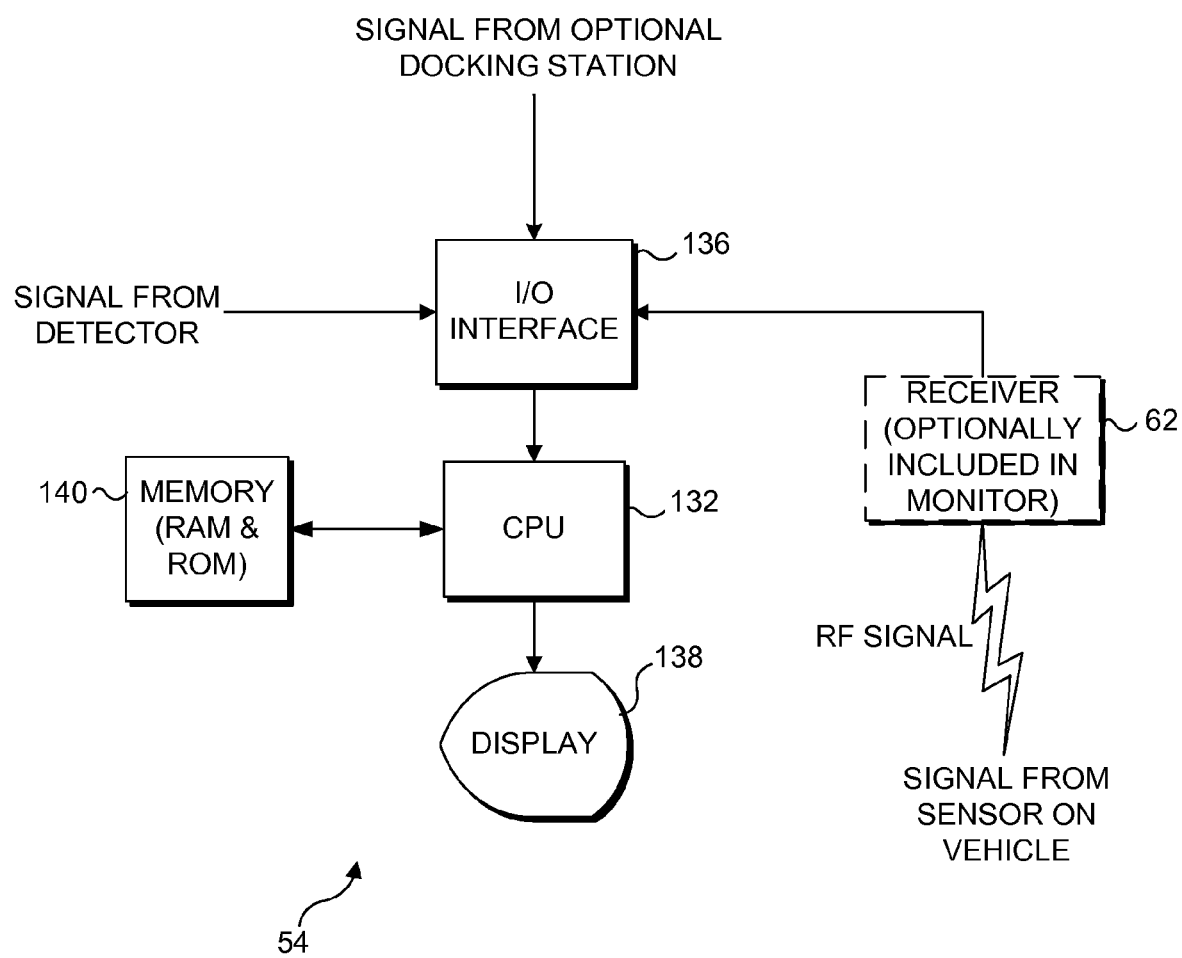
FIG. 10 is a block diagram of the functional components of the monitor.

FIG. 10 illustrates functional components of monitor 54. A central processing unit (CPU) 132 is coupled bi-directionally to a memory 140 that includes both random access memory (RAM) and read only memory (ROM). Memory 140 is used for storing data in RAM and machine instructions in ROM that control the functionality of CPU 132 when executed by it, to achieve the functions of the monitor that were disclosed above. CPU 132 is also connected through appropriate data ports to display 138. Optionally, receiver 62 is included within monitor 54, but can instead be external to the monitor. Input/output interface 136 is configured to transfer data from the portable device via a transmitter in the portable device (FIG. 6A), a docking station (FIG. 6B), or a hardwire data link. Receiver 62 receives the RF signal transmitted from portable device 86 or transmitter 134, which is on the vehicle, indicating that the person has reached the predefined location within the vehicle, as explained above.

Additional embodiments of the present invention can be implemented wherein more than one predefined location must be visited to complete the inspection, which as described above, may be a pre-trip inspection, a post-trip inspection, or an in-trip inspection (for example, for long trips, such as a voyage on a cruise ship, a cargo vessel, or a military vessel). Each separate predefined location can include a token that must be read using a hand-held reader, as described above. The reader can be programmed to send the second signal only if each token identified for a specific inspection has been read, or the second signal can be sent such that each token that has been read is identified. The monitor can then provide a report as to whether any predefined location was missed in the inspection. If desired, a complete additional inspection can then be performed, or an inspection only of the location that was missed can be performed. Instead of placing a token to be read by a hand held reader at each predefined location, a switch can be installed at each location. When the person is at the location, the person can activate the switch to verify that the person was proximate the specific location. In one embodiment, each switch is coupled to a transmitter that transmits the second signal, indicating that the person was present at that location to the monitor. The monitor can then determine which, if any, of the switches were not actuated to transmit a second signal (as long as the second signals uniquely identify the switch). The switches might be coupled to different transmitters, or all of the switches can be coupled to a common transmitter (for example, each switch is electrically coupled to a transmitter located within or upon the vehicle). The common transmitter can be configured to transmit the second signal after each switch is activated, and the second signal for each switch will uniquely identify the switch. Again, the monitor can determine any switch that was not activated during the inspection. In a different embodiment, the common transmitter is configured such that a second signal is not transmitted until all of the switches are activated. In such an embodiment, the monitor cannot determine a specific switch that was not activated, but can determine that the inspection was not completed properly. The common transmitter embodiment offers the advantage of a lower cost system, since only a single transmitter is required. For vehicles with many switches at different predefined locations, this approach can result in significant cost savings.

Many different types of switches can be employed. Mechanically activated switches, such as toggle switches, or switches activated by depressing a button are preferred. Individual switches can be lighted to enable the switch to be more easily located under low light conditions. In some applications, it may be desirable to prevent switches from being activated by unauthorized persons. Switches can be secured by requiring a lock to be unlocked to gain access to the switch. A switch that is activated by reading a magnetic strip, or an optical pattern, such as a bar code, can also be employed. Switches can be configured to respond to a reader, so that each switch includes an RFID tag and is activated only when interrogated by an appropriate reader or RF transmitter (such as the hand held reader described above in connection with FIG. 4). Some RF ID tags respond to an inductively coupled signal as well as RF interrogation. It should be understood that the present invention is not limited to a specific type of switch, and that any switch that can be activated by a person, either by physically manipulating the switch, or by interacting with the switch via some other mechanism (e.g., short distance RF communication or inductive coupling) can be employed. It is important that the switch be activatable only when the person is physically proximate the switch; otherwise, activation of the switch will not serve as an indication that the person was proximate a location requiring inspection. Thus, a switch responsive to activation using RF communication over relatively long distances (i.e., more than a few feet) will not be preferred.

On a very complex vessel, such as a large ocean going vessel, it may be desirable to designate many locations, and inspect only a subset of those locations during each inspection. The reader described above in conjunction with FIG. 4 will be particularly useful in such an implementation. Before the inspection is started, the reader (portable device 86) can be programmed with a list of locations that are to be inspected. If the person performing the inspection is sufficiently knowledgeable about the vessel, the reader may provide a brief prompt to guide the person to the first inspection point (e.g., Inspect equipment locker XYZ). More detailed instructions, such as a map of the vessel and the locations of the inspection locations, can be displayed if required. As noted above, the second signal (confirming that the inspection has been completed) may be generated regardless of how many inspection locations were actually visited, if the second signal uniquely identifies each location that was actually visited (i.e., each location where the handheld reader was positioned sufficiently close to a token that is proximate the location, to enable the reader to sense the token). A less useful embodiment would be configured to generate the second signal only if all locations were visited (this would be less efficient, because the monitor would only be able to determine that the inspection was improperly conducted, if at all, rather than being able to determine each location, or locations, that were missed). Enabling an inspection of fewer than all designated inspection locations to be verified may have significant security ramifications. In a large vessel (or a large land-based facility), there will likely be many thousands of separate locations that arguably should be inspected on a regular basis, for example, to ensure the vessel/facility is in good repair, and also to enable suspicious activity to be noticed. It would require an excessive amount of time to inspect 10,000 locations daily, but a subset of those locations could be easily inspected each day. The present invention enables the verification that a person was at a subset of many designated locations before a predetermined event has occurred (such as the end of a work shift, or the end of an allotted amount of time). Switches activated by the user at each location could be used in place of the hand held reader (portable device 86), however, electrically coupling all such switches to a common transmitter would be a significant task. Similarly, providing each switch with its own transmitter would be more expensive to implement than using a hand held reader and tokens (such as RFID tags or bar codes) disposed at each different predefined location. The specific locations inspected at any one time can be based on a predetermined pattern, or can be randomly generated for each new inspection.

In addition to randomizing the locations inspected, the monitor and the portable device could be used to randomize when specific locations are inspected. Consider a security sweep of a military facility. If the sweep follows a repeating pattern, an observer might be able to determine that a specific location is regularly inspected at a certain time. Someone wishing to access that location surreptitiously would merely avoid the location at the time indicated by the repeating pattern. The hand held device of FIG. 4 could be provided with a randomizing function, such that a plurality of inspection points is checked in a randomized order, to prevent a pattern from being recognized. This approach might increase the time required for inspections, because the person may have to back track several times, to visit all of the inspection points in the subset. The randomizing function could be implemented by the processor of the portable device, or a randomized list could be provided to the hand held device (for example, when the hand held device is placed in a docking station, as shown in FIG. 7). The list may include all the locations associated with the facility (or vessel), or a subset of the locations to be inspected. The present invention thus enables the verification that a randomized inspection of a plurality predefined locations was likely completed, before a predetermined event has occurred (such as the end of a work shift, or the end of an allotted amount of time). Again, while such a functionality could be enabled by providing a user-activatable switch at each location, a hand held device reading a token disposed at each predefined location is likely to be more cost effective to implement.

Figure 11:
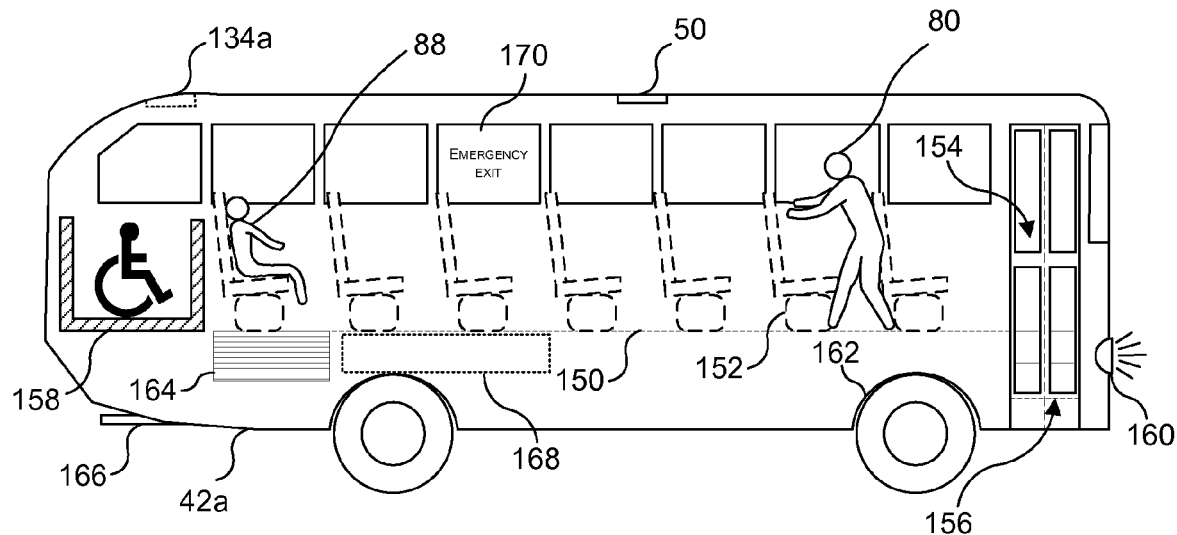
FIG. 11 is a side elevational cut-away view of a school bus, illustrating a plurality of inspection points associated with the bus, each inspection point having a switch that can be activated by a person inspecting the bus, to verify that the person was physically present to perform the inspection at that point.

FIG. 11 illustrates an example including a plurality of predefined inspection locations in a school bus 42a. Again, it should be understood that the present invention is not limited to school buses, or even to vehicles, but can be applied to other inspections, for example, an inspection of a land-based facility, such as a factory or military base. Bus 42a includes a plurality of predefined inspection points. Either a token or a switch with a transmitter is disposed proximate each inspection point, such that activation of the switch or reading of the token provides verification that a person was in a position to perform the required inspection. Thus, person 80 may use a portable reader, if tokens are disposed at each inspection point. As indicated above, some switches can be configured to be activated by a reader, as opposed to being manipulated by the person directly. The person walks to each inspection point, which likely includes locations within the bus and outside the bus. The person then either activates the switch or reads a token disposed at the predefined inspection location. If the person is using a hand held device such as portable device 86 (see FIG. 4), the device can prompt the person to move from one inspection point to the next. In embodiments where a portable device reads each token associated with a predefined inspection location, the second signal is transmitted to the monitor by the portable device, either via a hard wire connection (i.e., by a docking station) or wirelessly. Where each location to be inspected has a switch disposed proximate the location, then the second signal is transmitted either by a common transmitter (such as transmitter 134a, which is electrically coupled to each switch), or by a separate transmitter that is associated with each switch.

For a bus, it will likely to be important to inspect an inspection point 150 corresponding to a floor of the bus, an inspection point 152 corresponding to the areas under the seats of the bus, an inspection point 154 corresponding to a driver station, an inspection point 156 corresponding to steps in the bus, an inspection point 158 corresponding to any wheelchair lift in the bus, an inspection point 160 corresponding to any lights for the bus, an inspection point 162 corresponding to the wheel wells of the bus (reading a token or activating a switch for inspection point 162 preferably requires the person to examine the interior of the wheel well), an inspection point 164 corresponding to an engine of the bus, an inspection point 166 corresponding to an exhaust system for the bus, an inspection point 168 corresponding to fuel tanks and or air brake tanks for the bus, and an inspection point 170 corresponding to any emergency exits for the bus. More than one token/switch may be required for each type of inspection point. For example, inspection point 162, corresponding to the wheel wells, will preferably be implemented using four different switches/tokens (one at each wheel well).

Figure 12:
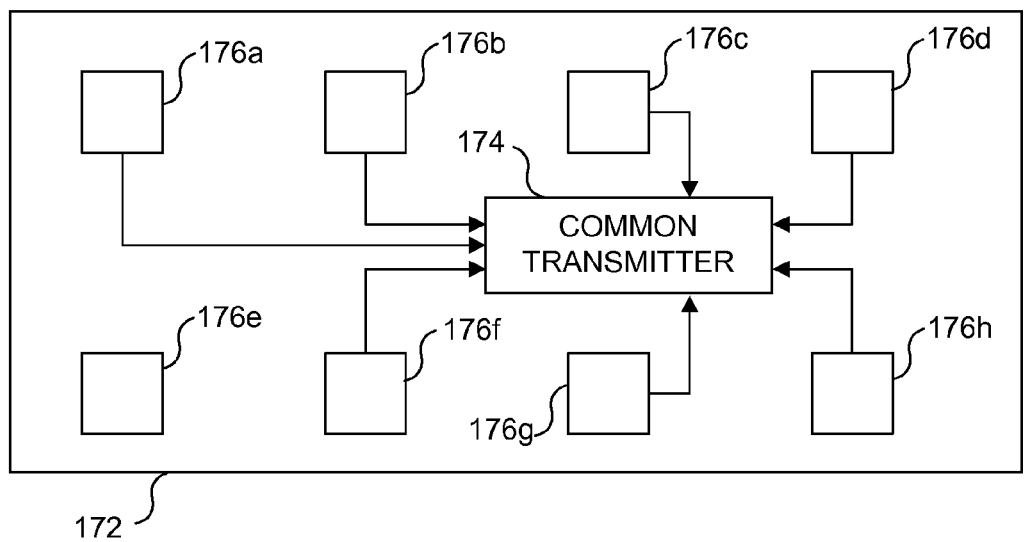
FIG. 12 is a block diagram of a vehicle (or a facility) including a plurality of switches disposed at specific inspection areas, wherein each switch is coupled to a common transmitter, the transmitter being configured to transmit a signal indicating the inspection has been performed.

FIG. 12 illustrates a vehicle 172 that includes a plurality of switches 176a-176h. Each of the eight switches is disposed proximate a predefined inspection point, and each switch is coupled to a common transmitter 174. In this embodiment, the number of transmitters required to transmit the second signal is reduced. As noted above, the common transmitter can be configured to transmit a second signal after each separate switch is activated, which will enable the monitor to identify any switch that was not activated. The common transmitter can also be configured not to transmit the second signal until all of the switches have been activated. This latter embodiment will enable the monitor to determine that the second signal was not received before the predefined event has occurred, thus indicating that the inspection was not properly performed. However, the latter embodiment will not enable the monitor to identify a specific switch that was not activated.

Figure 13:
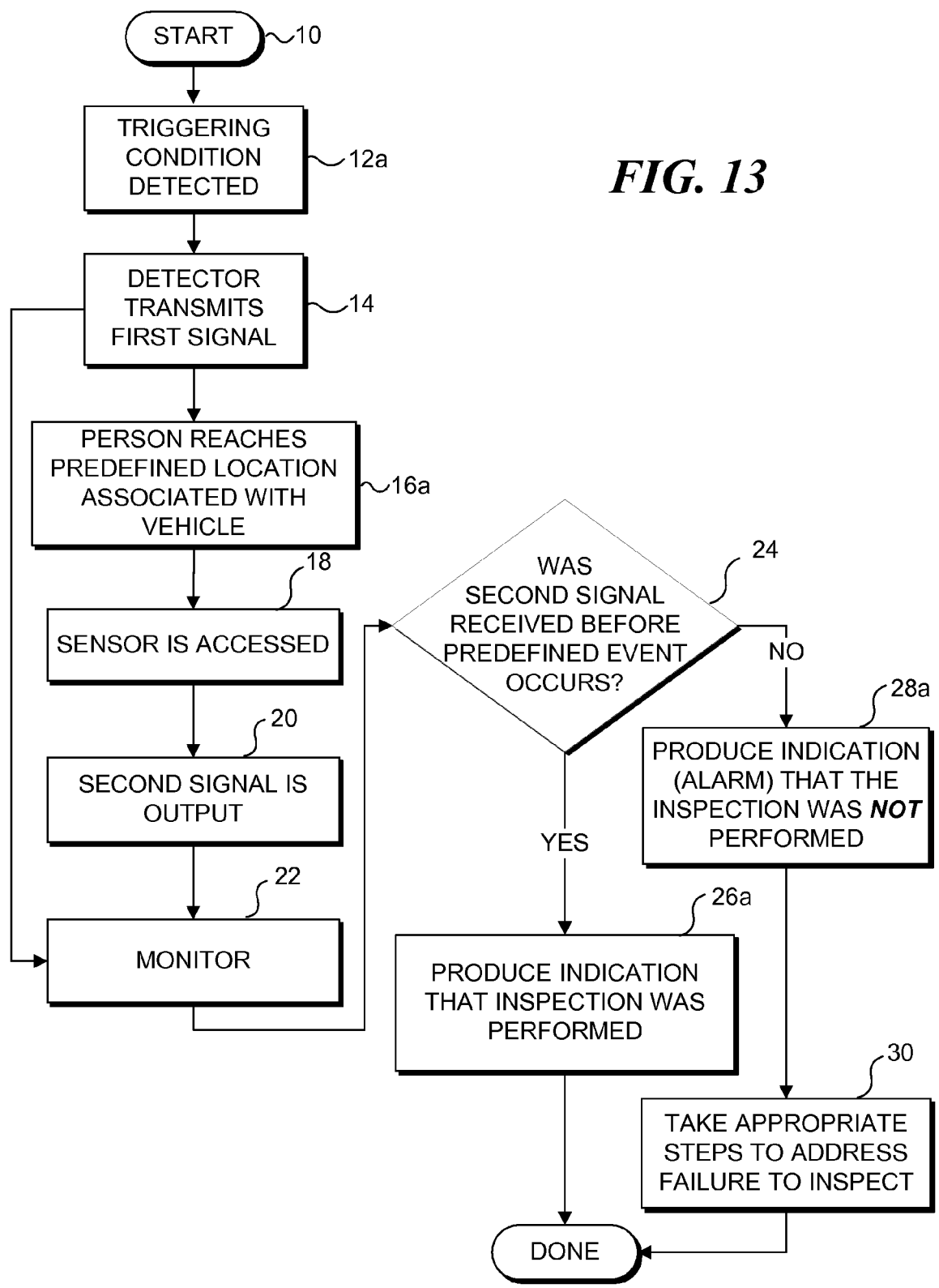
FIG. 13 is a flow chart similar to that of FIG. 1, but modified to illustrate that the present invention is also applicable to other types of inspections and is not limited to inspections of a vehicle.

FIG. 13 is based on FIG. 1, and has been modified to illustrate that the present invention is not limited to only post trip inspections, or to predefined inspection locations within a vehicle. Thus, block 12a has been changed to provide for detecting a triggering condition, rather than detecting that the vehicle has completed a trip. The triggering condition preferably indicates that the vehicles has either recently completed a trip, or will soon begin a trip. Detecting the completion of a trip has been discussed above. Similar methods can be used to detect that a trip will soon begin. One technique for detecting that a trip will begin is detecting that an engine on the vehicle has been started. Using the example of a school bus, when a driver starts the engine of the bus, a triggering condition (the bus starting) is detected. A circuit coupled to the ignition system of the bus can readily accomplish this task. Some vehicles are moved to a staging area before a trip is begun. For example, airplanes taxi to a certain area on a runway before takeoff. Fleet vehicles (such as police cars, service vehicles, rental cars, and buses) stored in a yard when not in use generally pass through a designated exit before leaving the yard, and a portion of the yard near the exit can be designated as an inspection area. The techniques discussed above for detecting the end of a trip can also be used to detect a vehicle entering such an inspection area. The triggering event can also be the lapse of a predefined interval of time. For example, some vehicle operators may require vehicles to be inspected every 24 hours. Ocean going vessels may have long intervals of time between the "start" of a trip and the "end" of a trip. Such vehicles will may require inspection during the trip. For long trips, the trip can be defined as a plurality of segments, the segments being based on a specific time interval (such as 24 hours) or a specific distance traveled. Thus, a measured time or distance can be used as a triggering condition.

Referring once again to the specific differences between FIG. 1 and FIG. 13, block 16a has been changed to indicate that a person has reached a predefined location associated with the vehicle, rather than a predefined location in the interior of the vehicle. Blocks 26a and 28a have been changed to emphasize that the inspection is not limited to just a post-trip inspection, but can be required at any point in a trip, or at any time.

FIGS. 14A-14C are flow charts illustrating the steps employed in the present invention to verify whether an inspection has likely been performed. While such inspections are often performed in connection with a vehicle, such as a bus, train, plane, ferry, cruise ship, cargo ship, military vessel and the like, either before, after or during a trip, it should be understood that the present invention can be employed in connection with inspections of a land-based installation, such as a school, factory, museum, office building, public building, power plant, dam, military installation, or any facility where there is a need to determine if a required inspection has likely been performed before a predetermined event occurs.

The logical process starts in a block 180. In a block 182, a triggering condition is detected. The purposes of detecting a triggering condition is to define a starting point after which the inspection should be conducted. In the embodiments described above, the starting point is typically associated with the beginning or end of a trip. Particularly for land-based installations, other starting points, such as the beginning of a work shift, will be more appropriate. A predetermined event will be used as an endpoint. The method verifies whether a person was in a location that would have enabled them to conduct the required inspection after the starting point (as indicated by the detection of a triggering condition) and before the endpoint (as indicated by the predetermined event). In some implementations of this invention, the triggering condition will be time dependent. For example, an administrator tasked with overseeing such inspections may mandate that a certain inspection will be conducted between the hours of 6:00 AM and 7:00 AM. In this case, detecting the triggering condition involves detecting that it is 6:00 AM in the corresponding time zone, and the predetermined event is the detection that it is 7:00 AM. Clearly other events can be used as a triggering condition. Unlocking a door into a factory could be a triggering condition, where an inspection of the factory is to be made before a certain assembly line is started (the predetermined event). Certain individuals may be specifically tasked with inspections, and the triggering condition can be based on actions of that employee. Where an employee keeps track of hours worked using a time clock, "clocking in" at the beginning of a shift can be used as a triggering condition, and "clocking out" at the end of a shift can be used as the predetermined event. Some employee badges include tokens (such as RFID tags or magnetic strips encoding employee data) that are read by appropriate sensors as the employee moves through a facility. The detection of an employee identification badge (or a biometric parameter, such as a handprint, a finger print, or a retinal scan) in a specific area can be a triggering condition. It should therefore be understood that the triggering condition is not limited to the conditions described above, but instead, can include almost any conditions, items, and phenomena that can be detected using available sensor technology.

In a block 184, the detector that identifies the triggering condition transmits a signal to a monitor. As described above, the function of the monitor is to determine if the predetermined event has occurred, and thereafter, to determine if a signal (indicating that a person was in a position to perform the inspection before the predetermined event occurred) has been received. If this signal has not been received before the predetermined event occurs, the monitor provides an indication of the failure to perform the inspection, so that appropriate action can be taken. The appropriate action may include contacting the person responsible for the inspection to determine why the inspection was not performed, or sending other personnel to complete the inspection. In certain cases, failure to be able to verify an inspection was performed may require preventing a planned action from be taken. For example, in a factory setting, the monitor can be configured to prevent an assembly line from being energized if the monitor determines that a required inspection has not been performed (i.e., that a person was not detected in a location proximate an area to be inspected, after a triggering condition was detected, and before a predetermined event occurs).

Generally, the monitor will be disposed in a location remote from the detector. A single monitor can be configured to monitor signals from multiple detectors, and to monitor multiple required inspections. Where a plurality of detectors are employed, each detector preferably uniquely identifies itself, and the triggering condition detected. Each detector can communicate with the monitor via a wired connection or a wireless connection, or a combination thereof. For example, in a large facility, a network of detectors in a single building may be coupled to a common transmitter located in that building, and the common transmitter can wirelessly communicate with the receiver.

In a block 186, the monitor waits for the predetermined event to occur. As discussed above in detail, the predetermined event can be the lapse of a specific period of time, or can be the occurrence of a specific event (such as a vehicle or piece of equipment being powered on or off, or an employee logging in or out, or almost any other type of event). Where the specific predetermined event is time based, the monitor is configured to track elapsed time, or is configured to receive notification when the time has elapsed. Where the specific predetermined event is an activity, such as powering up a piece of equipment, the monitor will be configured to detect the activity, or to receive an indication that the activity has occurred.

In a decision block 188, after the monitor has detected or received an indication that the predetermined event has occurred, and the monitor determines whether a second signal has been received, indicating that a person has been detected proximate a location requiring inspection, thereby indicating that the inspection could have been performed. If the second signal has been received, the logic terminates in a block 196 (as described above, the monitor can be configured to provide an indication that the inspection was performed). If the second signal was not received before the predetermined event occurred, then in a block 192, an indication is provided that the inspection has likely not been performed. This indication can be a visual readout, a visual or audible alarm, or any combination thereof. In a block 194, appropriate steps are taken to address this condition. Such steps can include, but are not limited to, notifying specific personnel, contacting the person who was to have performed the inspection, sending other personnel to complete the inspection, and preventing certain equipment from being operated until the inspection has been completed. Those of ordinary skill in the art will readily recognize that the appropriate steps to be taken will largely depend on the specific type of inspection being done, and thus, the above corrective actions ought not be considered to limit the invention.

FIGS. 14B and 14C illustrate different steps that can be employed to produce the second signal, in accord with the present invention. Referring now to FIG. 14B, as indicated in a block 198, a person is now proximate a location to be inspected (after the triggering condition has been detected). In a block 200, the person activates a switch proximate the location to be inspected. As discussed above, many different types of switches can be employed, including those physically manipulated by the person, and those responsive to a portable device carried by the person. In a block 202, the second signal, indicating the person was proximate the location to be inspected (and thus, that it is likely the inspection has been performed) is sent to the monitor. The switch can include a transmitter that sends the second signal, or the switch can be connected to a separate transmitter (such as the common transmitter of FIG. 12). Where an inspection relates to a plurality of locations and a plurality of switches, the second signal can indicate the switches that have been activated, or the second signal may be transmitted only after all switches are activated. While a portable device (such as that shown in FIG. 4) can be employed in connection with the steps of FIG. 14B (to activate a switch), a portable device will only be required if the switch employed requires the portable device for activation of the switch. In some embodiments, no portable device is required, and the person simply physically manipulates the switch.

Referring now to FIG. 14C, in a block 198a, a person with a portable reader (such as the reader of FIG. 4) is proximate a location to be inspected (after the triggering condition has been detected). In a block 200a, the person reads a token proximate the location to be inspected with the reader. As discussed above, many different types of token/readers can be employed, including RFID tags and readers configured to read RFID tags, and optical tokens (such as bar codes) and readers configured to read optical tokens. In a block 202, the second signal, indicating that the person was proximate the location to be inspected (and thus, is likely to have performed the inspection) is sent to the monitor. The portable reader itself can include a transmitter that sends the second signal, or the portable reader may be placed into a docking station (see FIG. 7) to enable the second signal to be transmitted to the monitor. Where an inspection relates to a plurality of locations and a plurality of tokens, the second signal can indicate the tokens that have been read, or the second signal may be transmitted only after all tokens are read.

Finally, yet another embodiment of the invention employs the logical steps shown in FIG. 15. In this embodiment, the second signal is sent only if a sensor (disposed at the predefined location to be inspected, or in a reader used to facilitate the inspection) determines that a triggering condition has been detected, and that the person was not proximate the location to be inspected before a predetermined event occurs. The second signal can be sent to a monitor, which then produces an indication the inspection was not performed as described above. Alternatively, the second signal can be transmitted to an individual tasked with performing appropriate steps to correct the failure to inspect.

The logical process of this embodiment of the invention starts in a block 204. In a block 182a, a triggering condition is detected. Different types of triggering conditions and detectors have been discussed in detail above, and need not be repeated here. In a block 184a, the detector that identifies the triggering condition transmits a signal to a sensor, rather than to the monitor, as described above. Where the sensor is part of a portable reader (such as the one shown in FIG. 4), the portable reader must be in range of the signal sent by the detector that detects the triggering condition. In this embodiment, the detector will likely transmit the signal as a wireless communication, although if the portable reader is stored in a docking station (see FIG. 7), the detector can send the first signal to the reader via a wired connection. If the sensor is part of a switch disposed at the predefined location to be inspected, the detector may be logically coupled to the sensor/switch, and the sensor/switch can be configured to receive a wireless communication from the detector.

In a block 186a, the sensor waits for a predetermine event to occur. In a decision block 206 (i.e., after the predefined event has occurred), the sensor determines if a person has been proximate the predefined location. As discussed in detail above, such a determination can be based on the person activating a switch at the predefined location, or the person can use a portable reader to read an RFID tag or an optical token (or some other token as discussed above). If in a decision block 206, if it is determined that the person has been detected at the predefined location, then the logic is finished, as indicated in a block 196a. If the sensor (which is capable of logical processing) determines that the person has not been detected at the predefined location, then in a block 208, the sensor transmits a second signal (which in this aspect of the invention indicates that the inspection has not been properly executed). Preferably, the sensor includes a transmitter configured to transmit the second signal to a receiver (such as a monitor as described above, or a person tasked with managing the inspection). Where the sensor is disposed at the predefined location (i.e., as the sensor in a sensor/switch activated by the person or by a portable device as described above), the sensor can be physically connected to a monitor or communication system, so that a transmitter is not required. Further, individual sensor/switches can be coupled to a common transmitter, as discussed above (see FIG. 12). If the sensor is part of a portable device reading tokens disposed at the predefined locations, the portable device (which includes the sensor) preferably also includes a transmitter. While portable devices without a transmitter can still send a second signal via wired connection (e.g., using the docking station of FIG. 7), if the portable device does not include a transmitter and is not returned to the docking station, then no second signal could be sent to indicate the inspection had not been completed. Thus, it is preferred for the portable device to include a transmitter. In a block 192a, an indication (such as an alarm) is generated indicating that the inspection was NOT performed. In a block 194a, an appropriate action, such as discussed above, can be taken to correct the failure to properly conduct the inspection.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for verifying whether at least one of a pre-trip inspection and a post-trip inspection of a vehicle has been performed, comprising the steps of:
   (a) detecting a triggering condition, the triggering condition indicating at least one of the following:
      (i) the vehicle is about to start at least a segment of a trip; and
      (ii) the vehicle has completed at least the segment of the trip;
   (b) after the triggering condition has been detected, transmitting a signal indicating that a person has been disposed proximate to at least one predefined location associated with the vehicle, while nominally conducting at least one of the pre-trip inspection and the post-trip inspection of the vehicle;
   (c) receiving the signal at a monitor that is not part of the vehicle, thereby enabling a person who is not disposed proximate to the vehicle to verify that the required inspection was performed; and
   (d) determining whether the signal has been received at the monitor before a predefined event occurs, and if not, determining that the person cannot yet have completed the at least one of the pre-trip inspection and the post-trip inspection of the vehicle, wherein if it is determined that the person cannot have completed the at least one of the pre-trip inspection and the post-trip inspection of the vehicle, performing at least one of the following functions:
      (i) storing data at a location other than at the vehicle, said data indicating that the person cannot have completed the at least one of the pre-trip inspection and the post-trip inspection of the vehicle;
      (ii) displaying a status message at a location other than at the vehicle, said status message indicating that the person cannot have completed the at least one of the pre-trip inspection and the post-trip inspection of the vehicle; and
      (iii) producing an alarm at a location other than at the vehicle.

2. The method of claim 1, wherein the alarm is displayed on a screen that is not part of the vehicle.

3. The method of claim 1, wherein the step of detecting the triggering condition comprises the step of identifying the vehicle.

4. The method of claim 3, wherein the step of identifying the vehicle comprises the step of remotely reading a token on the vehicle, said token being associated with the vehicle.

5. The method of claim 1, wherein the step of transmitting the signal occurs in response to at least one of the steps of:
  (a) reading a token that is disposed proximate to the at least one predefined location;
  (b) reading a plurality of tokens at a plurality of predefined locations, each of the plurality of tokens being disposed proximate to a different one of the plurality of predefined locations, such that the signal is not transmitted until all of the plurality of tokens have been read;
  (c) actuating a plurality of switches at the plurality of predefined locations, each of the plurality of switches being disposed proximate to a different one of the plurality of predefined locations, each switch being actuated by the person upon reaching the predefined location to which the switch is proximate, such that the signal is not transmitted until all of the plurality of switches are actuated;
  (d) reading a unique identification code that is disposed proximate to the at least one predefined location, with a sensor; and
  (e) reading a plurality of unique identification codes at the plurality of predefined locations with a sensor, each of the plurality of unique identification codes being disposed proximate to a different one of the plurality of predefined locations, such that the signal is not transmitted until all of the unique identification codes are read.

6. The method of claim 5, wherein the person carries a portable device when performing the at least one of the pre-trip inspection and the post-trip inspection of the vehicle, further comprising the step of using the portable device to read each unique identification code that is disposed proximate to each of the predefined locations.

7. The method of claim 1, wherein the predefined event comprises activating a switch that is external to the vehicle, where activation of the switch is intended to indicate that the at least one of the pre-trip inspection and the post-trip inspection of the vehicle has been completed.

8. The method of claim 1, wherein the step of detecting that the vehicle has completed the trip comprises the step of sensing the vehicle arriving at a location that corresponds to an end of the trip.

9. The method of claim 1, wherein the step of detecting a triggering condition comprises at least one of the steps of:
  (a) sensing that the vehicle is disposed at a location that corresponds to a beginning of at least the segment of the trip;
  (b) sensing that the vehicle has departed from a location that corresponds to the end of a previous trip;
  (c) sensing that the vehicle has been powered on;
  (d) determining that a predefined period of time has elapsed since a previous post-trip inspection;
  (e) sensing that the vehicle has arrived at a location that corresponds to an end of at least the segment of the trip; and
  (f) determining that a predefined period of time has elapsed since a previous pre-trip inspection.

10. The method of claim 1, wherein the predefined event comprises at least one of:
  (a) a lapse of a predefined interval of time since detecting that the vehicle is about to begin at least the segment of the trip;
  (b) a lapse of a predetermined time after powering on the vehicle;
  (c) actuation of a switch that is external to the vehicle, where actuation of the switch is intended to indicate that the at least one of the pre-trip and the post-trip inspection has been completed; and
  (d) receiving a second signal at the monitor, the second signal only being transmitted after an event indicating that the at least one of the pre-trip and the post-trip inspection was performed.

11. A system for verifying whether at least one of a pre-trip inspection and a post-trip inspection of a vehicle has been performed, comprising:
  (a) a detector that detects a triggering condition and produces a first signal indicative thereof, the triggering condition indicating at least one of the following:
    (i) the vehicle is about to start at least a segment of a trip; and
    (ii) the vehicle has completed at least the segment of the trip;
  (b) a sensor configured to produce a second signal indicating that a person has reached at least one predefined location associated with the vehicle, the at least one predefined location generally corresponding to an area to be inspected during the at least one of the pre-trip inspection and the post-trip inspection; and
  (c) a monitor that receives the first signal from the detector and the second signal from the sensor, said monitor producing an indication that the person cannot yet have performed the post-trip inspection of the vehicle, if the second signal has not been received by the monitor before a predefined event occurs after the first signal was received by the monitor, the monitor being disposed separate from the vehicle, such that a person remote from the vehicle can use the monitor to determine if the inspection was performed.

12. The system of claim 11, further comprising:
  (a) a transmitter for transmitting the second signal produced by the sensor; and
  (b) a receiver that receives the second signal, producing an output signal in response thereto, the output signal being conveyed to the monitor.

13. The system of claim 11, wherein the detector comprises one of the following:
  (a) a pressure sensor disposed at a location corresponding to at least one of an end of a segment of the trip and a beginning of a segment of the trip, said pressure sensor responding to a weight of the vehicle by producing the first signal;
  (b) a light sensor disposed at a location corresponding to at least one of an end of a segment of the trip and a beginning of a segment of the trip, said light sensor detecting passage of the vehicle past the light sensor, interrupting light received by the light sensor from a source, producing the first signal;
  (c) a video camera disposed at a location corresponding to at least one of an end of a segment of the trip and a beginning of a segment of the trip, said video camera producing an image of at least a portion of the vehicle that is indicative of the vehicle being at the location, causing the first signal to be produced;
  (d) a radio frequency (RF) source and an RF detector, one of the RF source and the RF detector being disposed on the vehicle, and the other of the RF source and the RF detector being disposed at a location corresponding to at least one of an end of a segment of the trip and a beginning of a segment of the trip, said RF detector responding to a radio signal from the RF source when the vehicle completes the trip, producing the first signal;
  (e) a token reading device that responds to a token disposed on the vehicle that is read by the token reading device when the vehicle has completed the trip, producing the first signal; and (f) a component configured to determine that the vehicle has been powered up.

14. The system of claim 11, wherein one of the first signal and the second signal identifies the vehicle.

15. The system of claim 11, wherein the sensor comprises a token reader that produces the second signal when the token reader is proximate a token, one of the token and the token reader being disposed at the predefined location within the vehicle, and the other of the token and the token reader being portable and carried by a person moving to the predefined location within the vehicle.

16. The system of claim 11, wherein the detector comprises a token reader that responds by producing the first signal when the token reader is proximate a token, one of the token and the token reader being disposed proximate an area where the detector detects when the vehicle has completed a trip, and the other of the token and the token reader being portable and carried by the vehicle.

17. The system of claim 11, further comprising an optically encoded identifier, wherein the sensor comprises an optical reader for reading the optically encoded identifier, at least one of the optical reader and the optically encoded identifier being disposed at the predefined location within the vehicle, and the other of the optical reader and the optically encoded identifier being carried by a person moving to the predefined location within the vehicle.

18. The system of claim 11, wherein the predetermined event comprises at least one of:
  (a) lapse of a predetermined time after powering up the vehicle; and
  (b) actuation of a switch that is external to the vehicle, wherein actuation of the switch is intended to indicate that the at least one of the pre-trip and the post-trip inspection has been completed.

19. The system of claim 11, wherein the indication is a status message that is displayed on a screen that is not part of the vehicle.

20. A method for verifying whether at least one of a pre-trip inspection and a post-trip inspection of a vehicle is likely to have been performed by a person, comprising the steps of:
  (a) detecting a triggering condition, the triggering condition indicating at least one of the following:
    (i) the vehicle is about to start at least a segment of a trip; and
    (ii) the vehicle has completed at least the segment of the trip;
  (b) waiting for a predefined event to occur;
  (c) determining if a second predefined event has occurred;
  (d) if the second predefined event has not occurred, determining that the person has not yet completed the at least one of the pre-trip inspection and the post-trip inspection of the vehicle, and transmitting a signal indicating that the person has not yet completed the at least one of the pre-trip inspection and the post-trip inspection of the vehicle; and
  (e) receiving the signal at a monitor that is not part of the vehicle, thereby enabling a person who is not proximate to the vehicle to verify whether the required inspection was performed.

21. The method of claim 20, wherein the second predefined event comprises a determination that the person has been proximate at least one predefined location associated with the vehicle.

22. A system for producing an indication when at least one of a pre-trip inspection and a post-trip inspection of a vehicle has not been performed, comprising:
  (a) a detector that detects a triggering condition and produces a first signal indicative thereof, the triggering condition indicating at least one of the following:
    (i) the vehicle is about to start at least a segment of a trip; and
    (ii) the vehicle has completed at least the segment of the trip;
  (b) a sensor configured to receive the first signal, to produce a second signal, and to transmit the second signal, the second signal being a wireless communication not limited by a line of sight, the second signal being produced only if each of the following conditions are met:
    (i) the first signal has been received;
    (ii) a predefined event has occurred; and
    (iii) the sensor has not detected that a person has been proximate to at least one predefined location associated with the vehicle, the at least one predefined location generally corresponding to an area to be inspected during the at least one of the pre-trip inspection and the post-trip inspection, the second signal thus indicating that a person has not yet completed the at least one of the pre-trip inspection and the post-trip inspection of the vehicle; and
  (c) a monitor that receives the second signal from the sensor, the monitor being disposed separate from the vehicle, such that a person remote from the vehicle can use the monitor to determine if the inspection was performed.

23. A method for verifying whether an inspection of a vehicle has likely been performed, comprising the steps of:
  (a) detecting a triggering condition, the triggering condition corresponding to a beginning of a period during which the inspection should be performed, the triggering condition comprising at least one condition selected from a group of conditions consisting of;
    (i) a first condition in which the vehicle is present at a predetermined location; and
    (ii) a second condition in which the vehicle has traveled a predetermined distance;
  (b) after the triggering condition has been detected, transmitting a signal indicating that a person has been proximate at least one predefined location associated with the inspection, while nominally performing the inspection; and
  (c) determining whether the signal has been received by a monitor, before a predefined event occurs, the monitor being disposed in a location remote from a detector used to detect the triggering condition and from the at least one predefined location, the monitor being configured to monitor signals from multiple detectors, and to monitor multiple inspections, the predefined event corresponding to the end of a period during which the inspection should be performed, and if not, determining that the person cannot yet have completed the inspection, wherein if it is determined that the person cannot yet have completed the inspection, performing at least one of the following functions:
    (i) storing data indicating that the person cannot yet have completed the inspection;
    (ii) displaying a status message indicating that the person cannot yet have completed the inspection of the vehicle; and
    (iii) producing an alarm at the monitor.

\* \* \* \* \*